(12) United States Patent
Agari et al.

(10) Patent No.: US 10,545,575 B2
(45) Date of Patent: Jan. 28, 2020

(54) TOUCH SCREEN AND TOUCH PANEL DEVICE

(71) Applicant: Mitsubishi Electric Corporation, Chiyoda-ku (JP)

(72) Inventors: Masafumi Agari, Tokyo (JP); Naoki Nakagawa, Tokyo (JP); Tae Orita, Tokyo (JP); Takeshi Ono, Tokyo (JP); Seiichiro Mori, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 131 days.

(21) Appl. No.: 15/541,135

(22) PCT Filed: Feb. 5, 2016

(86) PCT No.: PCT/JP2016/053472
§ 371 (c)(1),
(2) Date: Jun. 30, 2017

(87) PCT Pub. No.: WO2016/129516
PCT Pub. Date: Aug. 18, 2016

(65) Prior Publication Data
US 2018/0011537 A1    Jan. 11, 2018

(30) Foreign Application Priority Data

Feb. 10, 2015 (JP) ................................. 2015-023917

(51) Int. Cl.
*G06F 3/01* (2006.01)
*G06F 3/044* (2006.01)
*G06F 3/041* (2006.01)

(52) U.S. Cl.
CPC .............. *G06F 3/016* (2013.01); *G06F 3/044* (2013.01); *G06F 3/0416* (2013.01); *G06F 2203/04107* (2013.01); *G06F 2203/04112* (2013.01)

(58) Field of Classification Search
CPC ........ G06F 3/044; G06F 3/016; G06F 3/0416; G06F 2203/04112; G06F 2203/04107
See application file for complete search history.

(56) References Cited

U.S. PATENT DOCUMENTS 8,269,744 B2   9/2012  Agari et al.
8,390,598 B2   3/2013  Agari et al.
(Continued)

FOREIGN PATENT DOCUMENTS

CN    103765349 A    4/2014
JP    2010-061502 A  3/2010
(Continued)

OTHER PUBLICATIONS

International Search Report dated Apr. 26, 2016 in PCT/JP2016/053472, filed Feb. 5, 2016.
(Continued)

*Primary Examiner* — Christopher E Leiby
(74) *Attorney, Agent, or Firm* — Oblon, McClelland, Maier & Neustadt, L.L.P.

(57) ABSTRACT

A plurality of excitation electrodes, each disposed along a row direction, are provided on a back side of a transparent substrate, and a plurality of detection electrodes, each disposed along a column direction, a plurality of tactile sensation generation row electrodes, each disposed along the row direction, and a plurality of tactile sensation generation column electrodes, each disposed along the column direction, are provided on the front side of the transparent substrate. The front side of the transparent substrate is
(Continued)

defined as an operation screen. The excitation electrodes and the tactile sensation generation row electrodes are formed independently of each other, and the detection electrodes and the tactile sensation generation column electrodes are formed independently of each other. In the configuration, the excitation electrodes among the electrodes are situated furthest from the operation screen.

14 Claims, 14 Drawing Sheets

(56) References Cited

U.S. PATENT DOCUMENTS

| | | | |
|---|---|---|---|
| 9,423,896 | B2 | 8/2016 | Hong et al. |
| 9,568,999 | B2 | 2/2017 | Hong et al. |
| 2007/0212139 | A1* | 9/2007 | Sugiura ............... G03G 21/0035 399/353 |
| 2013/0063381 | A1 | 3/2013 | Wakuda |
| 2013/0063394 | A1* | 3/2013 | Wakuda ................. G06F 3/016 345/174 |
| 2014/0022467 | A1* | 1/2014 | Chai .................... G02F 1/13338 349/12 |
| 2014/0071067 | A1 | 3/2014 | Hong et al. |
| 2014/0071088 | A1 | 3/2014 | Hong et al. |
| 2014/0375580 | A1* | 12/2014 | Peshkin .................. G06F 3/016 345/173 |
| 2015/0316986 | A1* | 11/2015 | Xue ........................ G06F 3/041 345/173 |
| 2016/0062505 | A1* | 3/2016 | Hwang ................. G06F 3/0412 345/174 |
| 2017/0177120 | A1* | 6/2017 | Kyutoku ................. G06F 3/041 |

FOREIGN PATENT DOCUMENTS

| | | |
|---|---|---|
| JP | 2013-58153 A | 3/2013 |
| JP | 2013-058154 A | 3/2013 |
| JP | 2014-56580 A | 3/2014 |
| JP | 2014-238881 A | 12/2014 |

OTHER PUBLICATIONS

International Preliminary Report on Patentability and Written Opinion dated Aug. 24, 2017 in PCT/JP2016/053472 (with English language translation).
Office Action dated Aug. 12, 2019, in Chinese Patent Application No. 201680007381.3 (with English-language translation).

* cited by examiner

FIG. 3
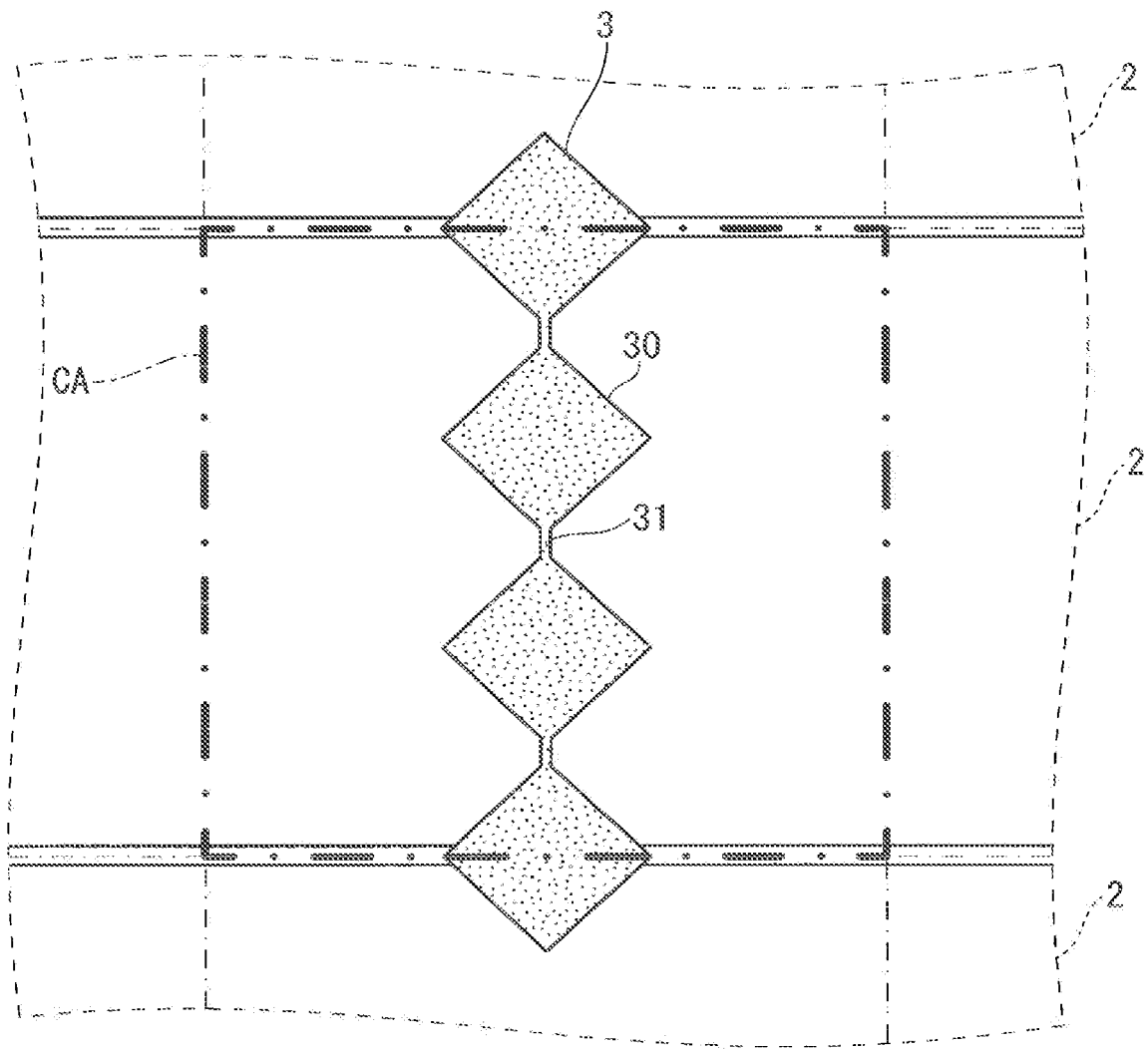
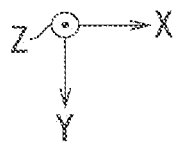

F I G. 4
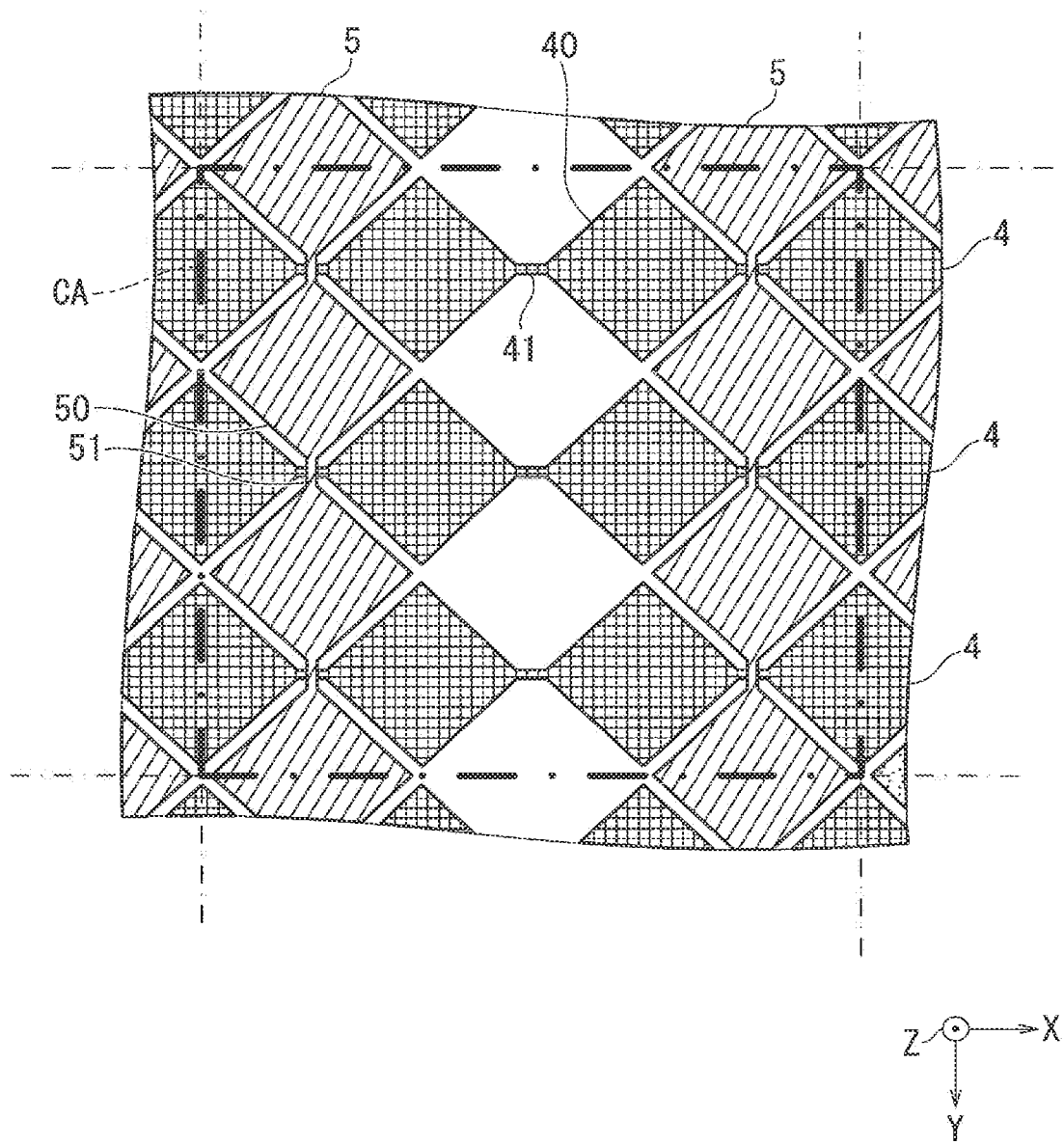

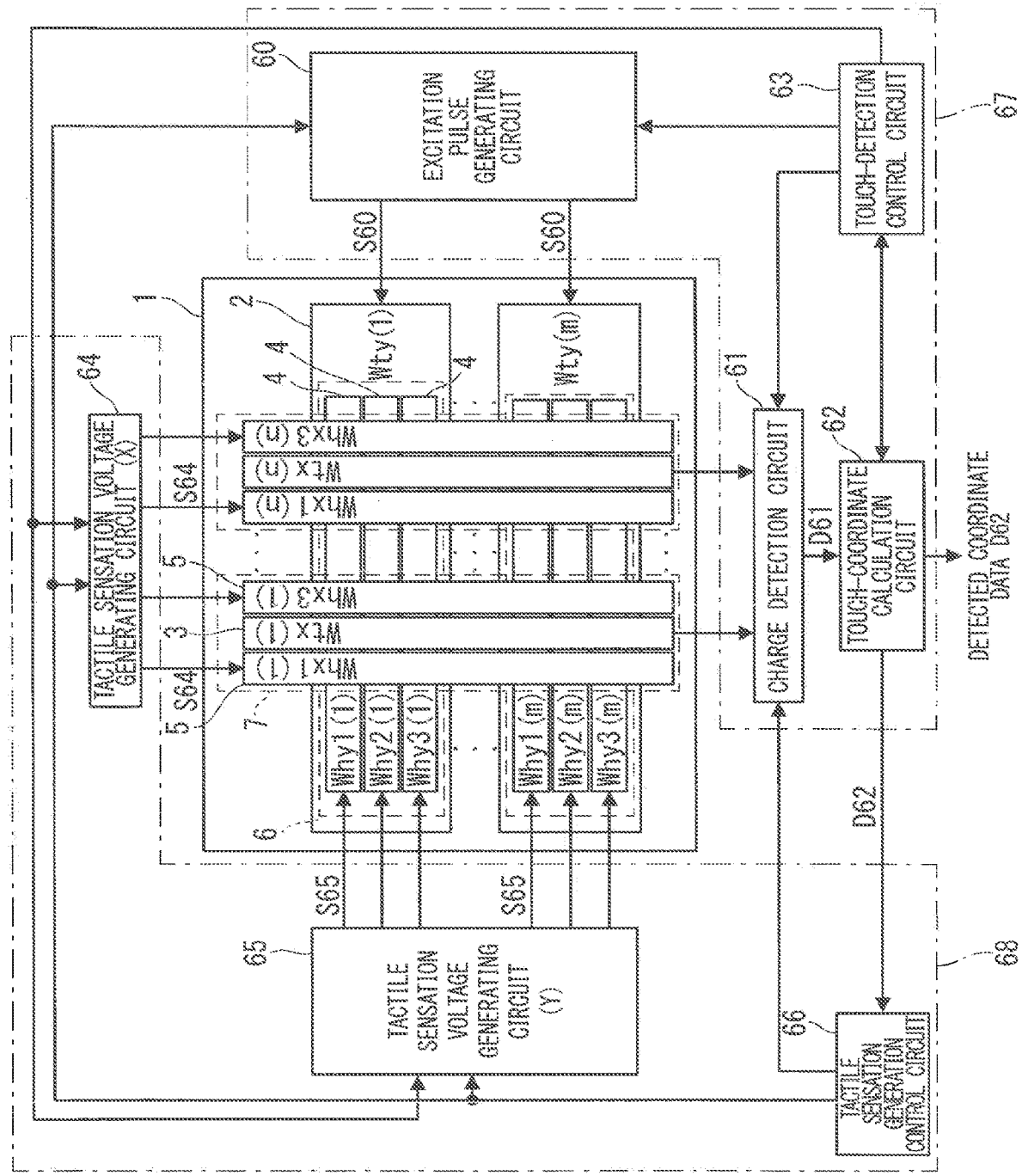
F I G. 6

TOUCH SCREEN AND TOUCH PANEL DEVICE

TECHNICAL FIELD

The present invention relates to a touch screen having a tactile sensation generating function, and a touch panel device including the touch screen.

BACKGROUND ART

Touch panels that detect a touch of an indicator such as a finger and identify the coordinates of the touched position have conventionally been receiving attention as one of excellent interface means. Various types of such touch panels including the resistive film type and the capacitive type have been proposed and commercialized.

For example, a projected capacitive type touch panel disclosed in Patent Document 1 is known as one type of the capacitive type touch panels. These touch panels have advantages such as excellent fastness properties, the ability to detect touches of gloved fingers, and long lifetime because of the unnecessity of moving parts, and therefore various techniques have been proposed.

The touch panel disclosed in Patent Document 1 has a touch panel including detection row wiring (row detection electrodes) and detection column wiring (column detection electrodes), and calculates and outputs touch coordinates, which indicate the position touched by an indicator on the touch screen, on the basis of the result of detection of a touch capacitance made up of the electrostatic capacitances between each detection electrode and the indicator. Each detection electrode is formed of fine metal wiring having a zigzag pattern repeated in a zigzag manner. Electrodes using a transparent conductive film such as indium tin oxide (ITO) are increasingly used as such detection electrodes.

A case is assumed in which an operator actually provide an input with the touch of a finger on the touch screen by, for example, moving the fingertip to a position corresponding to a bottom-shaped display object. Since only uniform tactile sensation is obtained from the surface of the touch screen, which is an operation screen, the operator can hardly obtain tracking information other than visual information and needs to visually check the operation screen. Besides, in order to confirm whether the touch input has been accepted, it is necessary to check a response, such as switching of the display screen, from a device that incorporates the touch panel. In view of this, a function (tactile sensation feedback function) has been proposed, which is a function of, when an operator has touched the operation screen with an indicator such as a finger, returning a response involving some sort of tactile sensation such as vibrations or electrical stimulation to the indicator.

As one example of such devices for providing tactile sensation to fingertips that have touched the operation screen, a tactile stimulation generation device disclosed in Patent Document 2 is known. The tactile stimulation generation device includes a coordinate input device (touch screen) having a front surface provided with a tactile stimulation generation sheet, and provides electrical stimulation to the fingertips of the operator by passing current from the positive electrodes of tactile sensation generation electrodes installed on the tactile stimulation generation sheet toward the negative electrodes thereof through the fingertips.

Patent Document 3 discloses a tactile touch panel device having both a touch detection function and a tactile-voltage generating function. The tactile touch panel device is constituted by a combination of a substrate on which touch driving lines (excitation electrodes) are installed and a substrate on which touch sensing lines (detection electrodes) are installed. In a vertical blanking period when no image data is supplied, a tactile sensation generation voltage is applied to each of the touch driving lines and the touch sensing lines during periods when no touch has been detected. On the back side of the tactile touch panel, a shield layer is additionally provided to interrupt the application of tactile sensation generation signals having a tactile sensation generation voltage to the display panel. When the display panel is a liquid crystal display panel, the shield layer is formed on an opposite substrate or an array substrate.

PRIOR ART DOCUMENTS

Patent Documents

Patent Document 1: Japanese Patent Application Laid-Open No. 2010-61502

Patent Document 2: Japanese Patent Application Laid-Open No. 2013-58153

Patent Document 3: Japanese Patent Application Laid-Open No. 2014-56580

SUMMARY OF INVENTION

Problems to be Solved by Invention

In the touch screen device disclosed in Patent Document 3, the shield layer, which is additionally provided on the back surface of the touch panel and has a tactile sensation voltage generation function, is ordinarily formed of a transparent conductive film, and thus cannot produce a sufficient shielding effect against the tactile sensation generation signals having a high tactile sensation generation voltage, because of the properties of the shield layer such as a relatively high electrode resistance and the inability to secure a sufficient number of GND nodes and an enough contact area. This tendency is particularly noticeable as the size of the touch screen increases.

When a touch screen device is composed by combining a touch screen and a separate tactile screen as disclosed in Patent Document 3, problems arise, such as an increase in the thickness of the touch screen and a reduction in contrast due to reflection at the interface between the plurality of screens.

When the touch detection electrodes and the tactile sensation generation electrodes are shared as in the touch screen device as disclosed in Patent Document 3, it becomes necessary to provide additional constituent elements such as a switching circuit with high breakdown voltage and increase the breakdown voltage of the touch detection circuit because the tactile sensation generation voltage has to be higher, e.g., several tens of volts or more, than the touch detection circuit voltage. This may create problems such as an increase in circuit scale.

Moreover, the touch screen device disclosed in Patent Document 3 cannot set different values to the pitch of the touch detection electrodes and the pitch of the tactile sensation generation electrodes, because the touch detection electrodes and the tactile sensation generation electrodes are shared with each other. Thus, if these electrode pitches are set in accordance with either one of the touch detection electrodes and the tactile sensation generation electrodes, problems arise such as the other electrode pitch becoming unnecessarily fine and making peripheral circuits complicated, or contrary to this, the other electrode pitch becoming unnecessarily rough and causing a reduction in performance such as touch detection resolution or tactile sensation generation resolution.

The present invention has been made in light of the above-described problems, and it is an object of the present invention to provide a touch screen that can improve the effect of shielding an incorporated display panel from the tactile sensation generation signals and suppress an increase in circuit scale, and to provide a touch panel device including the touch screen.

Means for Solving Problems

A touch screen according to a first aspect of the present invention is a touch screen having an operation screen that includes a plurality of first touch detection electrodes that are each disposed along a first direction and to which an excitation pulse signal is applied during a touch detection period when it is detected whether the operation screen has been touched, a plurality of second touch detection electrodes that are each disposed along a second direction that intersects with the first direction, a plurality of first tactile sensation generation electrodes that are each disposed along the first direction, independently of the plurality of first touch detection electrodes, and a plurality of second tactile sensation generation electrodes that are each disposed along the second direction, independently of the plurality of second touch detection electrodes. During a tactile sensation generation signal application period, a tactile sensation generation signal is selectively applied to the plurality of first tactile sensation generation electrodes or the plurality of second tactile sensation generation electrodes, and there is an interelectrode positional relationship in which, among the plurality of first touch detection electrodes, the plurality of second touch detection electrode, the plurality of first tactile sensation generation electrodes, and the plurality of second tactile sensation generation electrodes, the plurality of first touch detection electrodes are situated furthest from the operation screen.

Advantageous Effects of Invention

The touch screen according to the first aspect of the present invention achieves such an effect that the plurality of first touch detection electrodes situated furthest from the operation screen can shield the plurality of second touch detection electrodes, the plurality of first tactile sensation generation electrodes, and the plurality of second tactile sensation generation electrodes (hereinafter, also simply referred to as the "plurality of second touch detection electrodes and other electrodes"), all of which are situated closer to the operation screen than the plurality of first touch detection electrodes.

Since the display panel is ordinarily provided on the side opposite to the operation surface of the touch screen, the first touch detection electrodes exist between the display panel and the second touch detection electrodes and other electrodes according to the aforementioned interelectrode positional relationship. It is thus possible to suppress intrusion of driving nozzle from the display panel into the plurality of second touch detection electrodes, and to suppress intrusion of the tactile sensation generation signals, which are applied selectively to the plurality of first tactile sensation generation electrodes and the plurality of second tactile sensation generation electrodes, as noise into the above display panel and thereby suppress the occurrence of display problems such as unevenness in display.

Because the (first or second) touch detection electrodes and the (first or second) tactile sensation generation electrodes are not shared with each other, additional constituent elements such as a switching circuit with high breakdown voltage, which may be required to conduct or interrupt the tactile sensation generation signals, become unnecessary, and the circuit configuration of the touch panel device including the touch screen according to the first aspect of the present invention can be simplified.

Since, as described above, the touch detection electrodes and the tactile sensation generation electrodes are not shared with each other, the electrodes can be arranged such that the array pitch of the touch detection electrodes in the first or second direction of the touch detection electrodes, which is set on the basis of the desired touch coordinate precision, can be set different from the array pitch of the tactile sensation generation electrodes in the first or second direction of the tactile sensation generation electrodes, which is set on the basis of the desired tactile sensation generation resolution. Thus, it is possible to reliably avoid situations such as where the array pitch of one of the touch detection electrodes and the tactile sensation generation electrodes may be set unnecessarily narrow, which makes the device configuration complicated, or contrary to this, where the array pitch of one of the touch detection electrodes and the tactile sensation generation electrodes may be set unnecessarily wide, which sacrifices the precision of the touch coordinates or the tactile sensation generation resolution.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a plan view extracting and illustrating detection electrodes 3 in the intersection area CA illustrated in FIG. 1.

FIG. 4 is a plan view extracting and illustrating tactile sensation generation row electrodes 4 and tactile sensation generation column electrodes 5 in the intersection area CA illustrated in FIG. 1.

FIG. 6 is a block diagram illustrating a configuration of a touch panel device according to Embodiment 1.

EMBODIMENTS FOR IMPLEMENTING INVENTION

Embodiment 1

Overall Configuration

Figure 1:
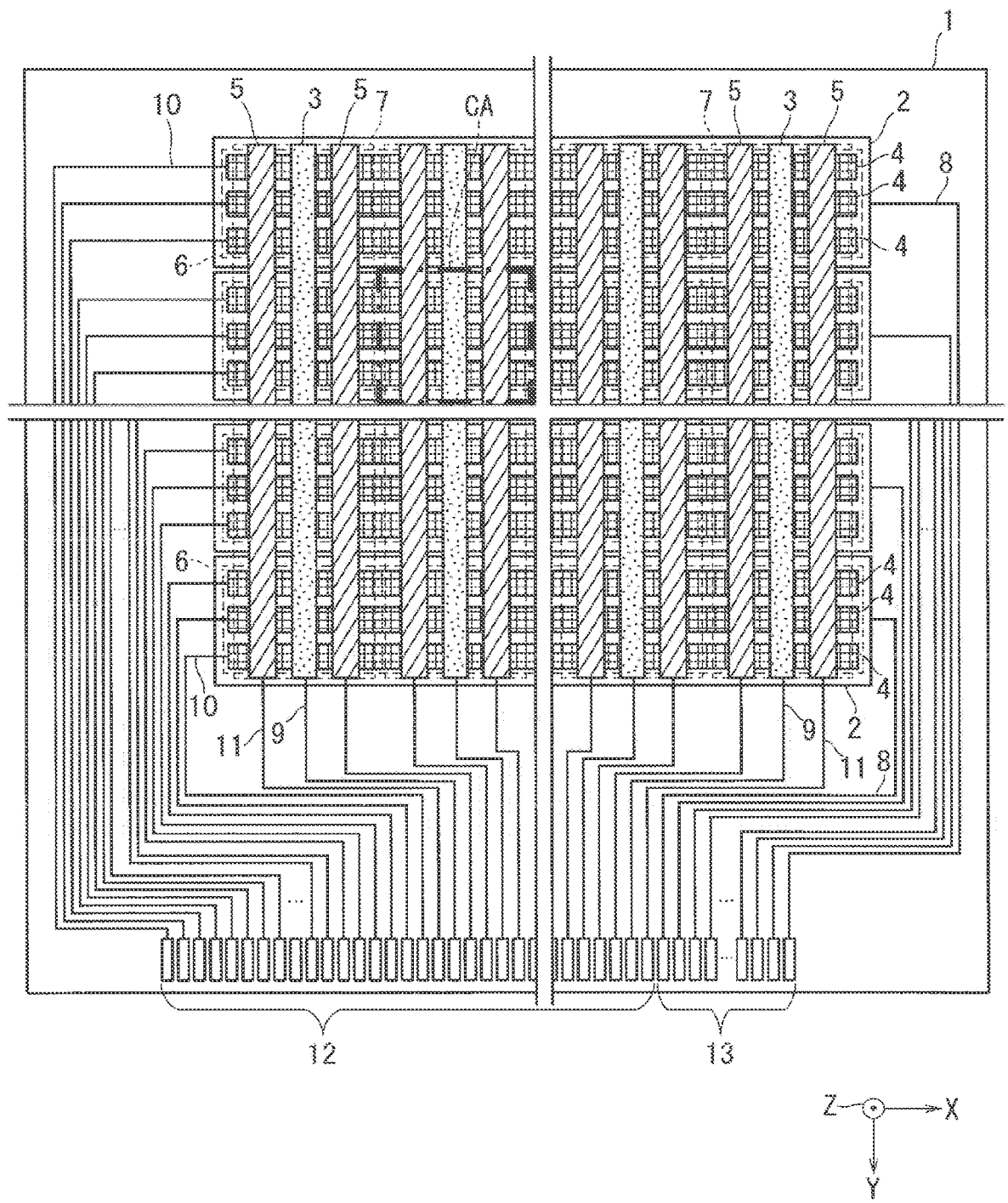
FIG. 1 is a plan view schematically illustrating a configuration of a touch screen according to Embodiment 1 of the present invention.
Figure 2:
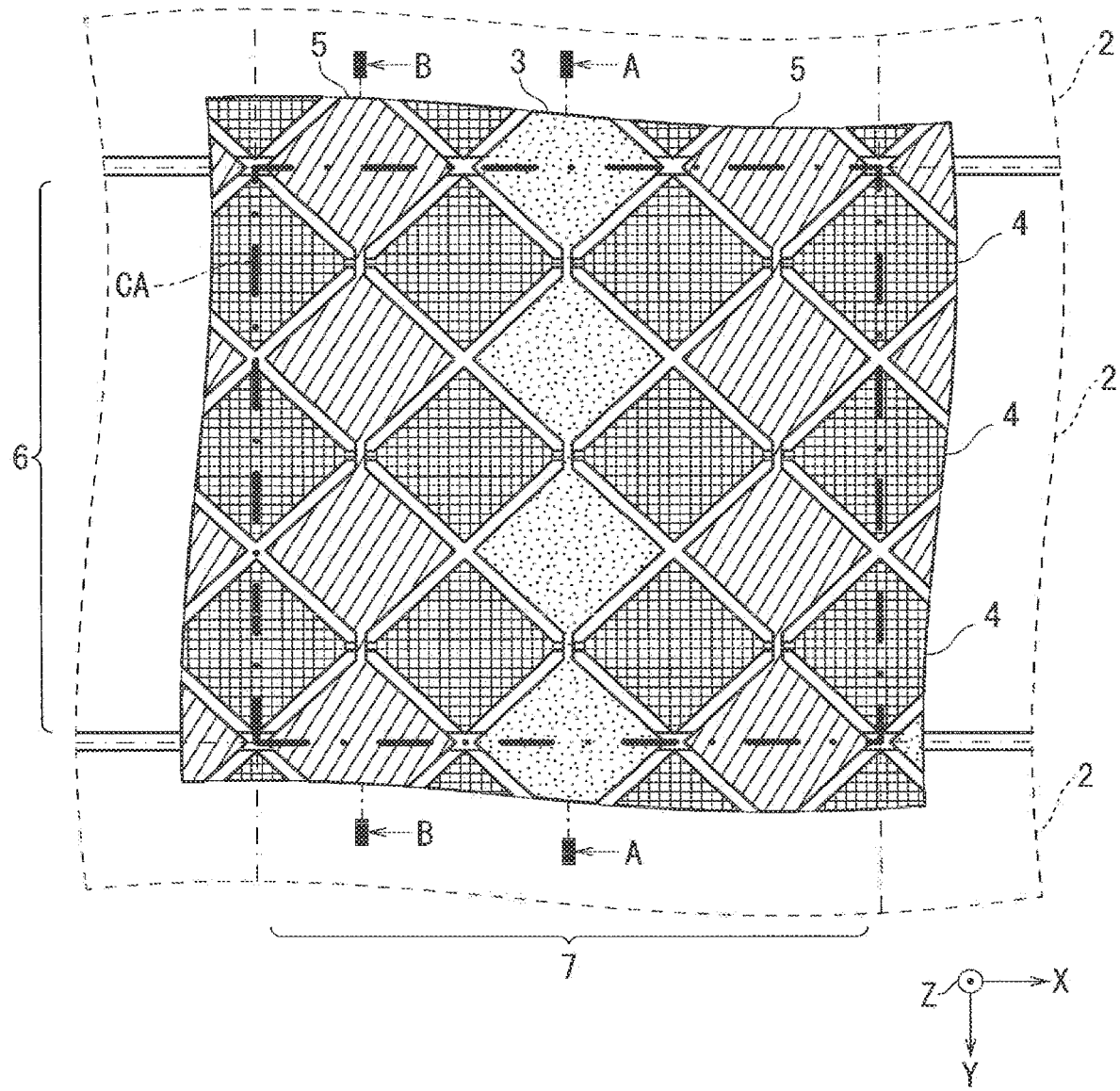
FIG. 2 is a plan view illustrating a configuration of a tactile sensation row electrode group and a tactile sensation column electrode group in an intersection area CA illustrated in FIG. 1.

FIG. 1 is a plan view schematically illustrating a configuration of a touch screen having a tactile sensation generating function according to Embodiment 1 of the present invention. FIGS. 2 to 4 are plan views schematically illustrating an intersection area CA and the vicinity thereof in FIG. 1.

Hereinafter, the configuration of a touch screen 1 according to Embodiment 1 will be described with reference to FIGS. 1 to 4. Note that the plan views in FIGS. 1 to 4 are viewed from the operation surface side on which an operator provides an input with an indicator such as a finger. The same reference numerals used in the drawings, including those in Embodiments 2 to 4 described below, indicate the same or corresponding constituent elements. As in the case of FIGS. 1 to 4, FIGS. 5 and 8 to 14 also show an XYZ orthogonal coordinate system.

As illustrated in FIG. 1, a plurality of excitation electrodes 2 (first touch detection electrodes), each disposed along a row direction (first direction, which corresponds to the X direction in the drawings), are formed on the back (rear or other main surface) side of a transparent substrate (not shown in FIGS. 1 to 4) of the touch screen 1. The plurality of excitation electrodes 2 are repeatedly arranged at a first pitch in a column direction (second direction, which corresponds to the Y direction in the drawings). In the specification of the present invention, the term "pitch" refers to an interval (distance) between common positions (e.g., center lines) of adjacent objects of the same type (in the above case, the excitation electrodes 2).

On the other hand, a plurality of detection electrodes 3 (second touch detection electrodes), each disposed along the column direction, are formed on the front (fore or one main surface) side of the transparent substrate. The plurality of detection electrodes 3 are repeatedly arranged at a second pitch in the row direction. It is conceivable to use, for example, a glass substrate as the transparent substrate.

Here, the plurality of excitation electrodes 2 and the plurality of detection electrodes 3 are used in the operation of detecting a touch of an indicator such as the operator's finger. For example, to touch detection operation is performed in the way described below. First, an excitation pulse signal (charging pulse signal) is sequentially applied from the outside of the touch screen to each excitation electrode 2. Then, electrical charges in excitation-detection interelectrode capacitances (mutual capacitances) between the excitation electrode 2 to which the excitation pulse signal is applied and each detection electrode 3 are detected outside the touch screen via the detection electrodes 3.

When an indicator such as a finger has approached or contacted the touch screen, the electric field formed between the excitation electrodes and the detection electrodes is interrupted, and the mutual capacitances decrease. The present embodiment is described assuming the use of a mutual capacitance detection method in which the occurrence of a touch operation and the touched position are detected on the basis of the result of detection of the electrical charges corresponding to the mutual capacitances between the excitation electrodes and the detection electrodes.

A plurality of tactile sensation generation row electrodes 4 (first tactile sensation generation electrodes), each disposed along the row direction, are further formed on the front side of the transparent substrate. The plurality of tactile sensation generation row electrodes 4 are repeatedly arranged at a third pitch in the column direction. Thus, the plurality of tactile sensation generation row electrodes 4 are formed independently of the plurality of excitation electrodes 2. In the present embodiment, the configuration is such that three tactile sensation generation row electrodes 4 are formed in correspondence with one excitation electrode 2 formed on the back side of the transparent substrate, and such an area of combination of one excitation electrode 2 and three tactile sensation generation row electrodes 4 in a plan view is referred to as a "tactile row electrode group 6." This configuration indicates that the first pitch of the excitation electrodes 2 is set to three times the third pitch of the tactile sensation generation row electrodes 4.

A plurality of tactile sensation generation column electrodes 5 (second tactile sensation generation electrodes), each disposed along the column direction, are further formed on the front side of the transparent substrate, independently of the plurality of detection electrodes 3. The plurality of tactile sensation generation column electrodes 5 are repeatedly arranged in the row direction.

In the present embodiment, two tactile sensation generation column electrodes 5 are arranged on each side of each detection electrode 3. That is, a total of three electrodes, including one detection electrode 3 and two tactile sensation generation column electrodes 5 on each side of the detection electrode 3, constitute a column electrode group 7. The plurality of column electrode groups 7 are repeatedly arranged in the row direction. At this time, a pitch between each detection electrode 3 and each tactile sensation generation column electrode 5 that are adjacent to each other, among the plurality of detection electrodes 3 and the plurality of tactile sensation generation column electrodes 5, and a pitch between each adjacent pair of the tactile sensation generation column electrodes 5 are both set to a fourth pitch.

Here, the plurality of tactile sensation generation row electrodes 4 and the plurality of tactile sensation generation column electrodes 5 respectively function as first and second tactile sensation generation electrodes that are used to generate tactile sensation on the indicator such as the user's finger. For generation of tactile sensation, for example, a tactile sensation generation row electrode 4 and a tactile sensation generation column electrode 5 that correspond to target row and column positions at which tactile sensation is to be generated, among the plurality of tactile sensation generation row electrodes 4 and the plurality of tactile sensation generation column electrodes 5, are determined as a selected tactile sensation generation row electrode 4 and a selected tactile sensation generation column electrode 5 (first and second selected tactile sensation generation electrodes).

There is a first method in which electrical stimulation is given to the tactile organ of the skin by applying first and second tactile sensation generation signals to the selected tactile sensation generation row electrode 4 and the selected tactile sensation generation column electrode 5 to pass current (percutaneous current) through the skin in the vicinity of the finger surface serving as the indicator. Note that the first and second tactile sensation generation signals have a positive voltage and a negative voltage as tactile sensation generation voltages ("H" pulse and "L" pulse).

There is also a second method in which vibrations are transmitted to the tactile organ of the skin using feeble static electricity generated between the screen and the finger, by applying the first and second tactile sensation generation signals to the selected tactile sensation generation row electrode 4 and the selected tactile sensation generation column electrode 5 and storing an electrical charge in a charge storage layer that is additionally formed on the surface of the transparent substrate. In this case, both of the first and second tactile sensation generation signals have tactile sensation generation voltages of the same polarity ("H" pulse).

In this way, the tactile sensation generating method includes the first method and the second method, and either of the first method and the second method may be adopted The plurality of excitation electrodes 2 on the back side of the transparent substrate are electrically connected to a plurality of back-side terminals 13 (external connection terminals) that are also formed on the back side of the transparent substrate, via a plurality of lead lines 8. Note that the plurality of lead lines 8 are also formed on the back side of the transparent substrate.

The plurality of detection electrodes 3 on the front side of the transparent substrate are electrically connected to a plurality of front-side terminals 12 (external connection terminals) that are also formed on the front side of the transparent substrate via a plurality of lead lines 9.

Similarly, the plurality of tactile sensation generation row electrodes 4 on the front side of the transparent substrate are respectively electrically connected to the front-side terminals 12 via a plurality of lead lines 10, and the plurality of tactile sensation generation column electrodes 5 on the front side of the transparent substrate are electrically connected to the plurality of front-side terminals 12 via a plurality of lead lines 11. Note that the plurality of lead lines 9 to 11 are formed on the front side of the transparent substrate.

In this way, the plurality of excitation electrodes 2, each disposed along the row direction, are repeatedly formed in the column direction, and the plurality of detection electrodes 3, each disposed along the column direction, are repeatedly formed in the row direction. This configuration provides a matrix of intersection areas in which the plurality of excitation electrodes 2 and the plurality of detection electrodes 3 overlap one another in a plan view.

Similarly, the plurality of tactile sensation generation row electrodes 4, each disposed along the row direction, are repeatedly formed in the column direction, and the plurality of tactile sensation generation column electrodes 5, each disposed along the column direction, are repeatedly formed in the row direction. This configuration provides a matrix of intersection areas in which the plurality of tactile sensation generation row electrodes 4 and the plurality of tactile sensation generation column electrodes 5 overlap one another in a plan view.

In the present embodiment, the plurality of tactile sensation generation row electrodes 4 are arrayed in the column direction in such a mode as to define the tactile sensation row electrode groups 6, each consisting of one excitation electrode 2 and three tactile sensation generation row electrodes 4.

The plurality of detection electrodes 3 and the plurality of tactile sensation generation column electrodes 5 are arrayed in the row direction such that the column electrode groups 7 are formed of a total of three electrodes, including one detection electrode 3 and two tactile sensation generation column electrodes 5 on each side of the detection electrode 3.

At this time, the array pitch in the column direction of the tactile sensation row electrode groups 6 is set to the same interval as the aforementioned first pitch between the excitation electrodes 2, and the array pitch in the row direction of the column electrode groups 7 is set to approximately the same interval as the aforementioned second pitch between the detection electrodes 3.

Similarly, the aforementioned third pitch, which is the array pitch in the column direction of the tactile sensation generation row electrodes 4, is set to approximately the same interval as the aforementioned fourth pitch, which is the array pitch in the row direction of the detection electrodes 3 and the tactile sensation generation column electrodes 5.

Here, the electrodes are arrayed, for example, such that the first pitch (which is approximately equal to the second pitch) is approximately 5 mm, and the third pitch (which is approximately equal to the fourth pitch) is approximately (5/3) mm.

In the present embodiment, the configuration is such that the pitches of the tactile sensation electrodes (third and fourth pitches) are set narrow in order to give more sensitive tactile sensation to the indicator such as a finger.

Structures of Detection Electrodes 3, Tactile Sensation Generation Row Electrodes 4, and Tactile Sensation Generation Column Electrodes 5

FIG. 2 is a plan view illustrating an intersection area CA of a tactile sensation row electrode group 6 and a column electrode group 7 and the electrode configuration in the vicinity of the intersection area CA in FIG. 1. FIG. 3 is a plan view extracting and illustrating only excitation electrodes 2 and detection electrodes 3, which are respectively first and second touch detection electrodes, in the intersection area CA. FIG. 4 is a plan view extracting and illustrating only tactile sensation generation row electrodes 4 and tactile sensation generation column electrodes 5, which are respectively first and second tactile sensation generation electrodes. To facilitate recognition of the shapes of the detection electrodes 3, the tactile sensation generation row electrodes 4, and the tactile sensation generation column electrodes 5 in FIGS. 2 to 4, the excitation electrodes 2 are illustrated in a simplified manner in FIGS. 2 and 3 and not shown in FIG. 4.

Here, at least principal parts of the electrodes 3 to 5 are assumed to be configured of, for example, a transparent conductive film such as indium tin oxide (ITO). Note that a stacked structure of each electrode will be described later.

As illustrated in FIGS. 2 to 4, the excitation electrodes 2 on the back side of the transparent substrate (not shown in FIGS. 2 to 4) in the present embodiment are electrodes that extend in the row direction (X direction in the drawings) and have a rectangular shape in a plan view. The excitation electrodes 2 adjacent to one another are arrayed in the column direction (Y direction in the drawings) at a minute interval of several tens of μm. As illustrated in FIG. 1, the plurality of excitation electrodes 2 are arrayed so as to overlap with the entire area of arrangement of the electrodes 3 to 5 on the front side of the transparent substrate in a plan view.

When a touch has been detected, the plurality of excitation electrodes 2 on the back side of the transparent substrate are driven at low impedance of, for example, approximately several tens of Ω to several hundreds of Ω outside the touch screen 1. That is, the plurality of excitation electrodes 2 are set to a conducting state, not to a floating state, by being set to a charging voltage for excitation pulse or a GND voltage (ground voltage).

Accordingly, the plurality of excitation electrodes 2 can shield the plurality of detection electrodes 3 from propagation of noise generated by driving a display panel such as a liquid crystal display panel that is incorporated and used on the back side of the touch screen 1.

When tactile sensation is generated by the plurality of tactile sensation generation row electrodes 4 and the plurality of tactile sensation generation column electrodes 5, the plurality of excitation electrodes 2 are connected to fixed a potential node having low impedance for setting a GND voltage outside the touch screen 1. Accordingly, the plurality of excitation electrodes 2 can shield the display panel from propagation of the tactile sensation generation signals having a high tactile sensation generation voltage (from several tens of volts to several hundreds of volts) applied to the tactile sensation generation row electrodes 4 and the tactile sensation generation column electrodes 5, in order to prevent the tactile sensation generation signals from entering as signal noise into various electrodes or display elements of the display panel and causing problems such as unevenness in display images.

As illustrated in FIGS. 2 and 4, the plurality of tactile sensation generation row electrodes 4 on the front side of the transparent substrate are entirely formed of a transparent conductive film to the same height. Thus, the tactile sensation generation row electrodes 4 may be formed as the same wiring layer (first wiring layer).

As illustrated in FIG. 4, each tactile sensation generation row electrode 4 is configured by a combined structure of a plurality of tactile sensation generation row electrode principal parts 40 (first tactile sensation generation principal parts) and a plurality of tactile sensation generation row electrode intersection parts 41 (first tactile sensation generation intersection parts).

The tactile sensation generation row electrode principal parts 40 have a generally square rhombus shape in a plan view and each have two pairs of opposing angular portions that are respectively arranged in the row and column directions. The tactile sensation generation row electrode intersection parts 41 extend in the row direction and have a width that is sufficiently narrower in the column direction (Y direction) than a maximum width of the tactile sensation generation row electrode principal parts 40.

Each adjacent pair of the plurality of tactile sensation generation row electrode principal parts 40 are configured such that right and left opposite angles thereof, which are angular portions facing each other in the row direction, are connected by the tactile sensation generation row electrode intersection parts 41.

For convenience of illustration, the electrode shapes of the detection electrodes the tactile sensation generation row electrodes 4, and the tactile sensation generation column electrodes 5 other than the excitation electrodes 2 are also illustrated as rectangular shapes in FIG. 1.

In the present embodiment, each rectangular excitation electrode 2 on the back side of the transparent substrate is arranged so as to overlap with almost a whole of three tactile sensation generation row electrodes 4 (=K≥2) in a plan view (see FIGS. 1 and 2).

This arrangement can improve the shielding effect of the excitation electrodes 2 functioning as the first touch detection electrodes against the tactile sensation generation row electrodes 4, and can more effectively suppress intrusion of some of the tactile sensation generation signals as noise into the display panel and thereby suppress the occurrence of display problems such as unevenness in display, when the tactile sensation generation signals having their "H" levels set to high tactile sensation generation voltages are applied to the tactile sensation generation row electrodes 4.

Also, the plurality of excitation electrodes 2 and the plurality of tactile sensation generation row electrodes 4 can be arrayed regularly by setting a ratio of the first pitch, which is the array pitch in the column direction of the excitation electrodes 2, and the second pitch, which is the array pitch in the column direction of the tactile sensation generation row electrodes 4, to an integer ratio of 3:1. Thus, there is no unevenness in transmittance due to uneven overlaps of the excitation electrodes 2 which are the first touch detection electrodes (touch detection row electrodes), and the tactile sensation generation row electrodes 4, which are the first tactile sensation generation electrodes. As a result, it is possible to suppress a situation where the electrodes are visually recognized due to the presence of uneven overlaps.

Parts of the detection electrodes 3 and the tactile sensation generation column electrodes 5 are formed above parts of the tactile sensation generation row electrodes 4 on the front side of the transparent substrate. As illustrated in FIG. 3, each detection electrode 3 is configured by a combined structure of a plurality of detection electrode principal parts 30 (detection principal parts) and a plurality of detection electrode intersection parts 31 (detection intersection parts).

The detection electrode principal parts 30 have a generally square rhombus shape in a plan view and each have two pairs of opposing angular portions that are respectively arranged in the row and column directions. The detection electrode intersection parts 31 extend in the column direction and have a width in the row direction that is sufficiently narrower than a maximum width of the detection electrode principal parts 30.

Each adjacent pair of the plurality of detection electrode principal parts 30 are configured such that upper and lower opposite angles thereof that face each other in the column direction are connected by the detection electrode intersection parts 31. Note that the detection electrode intersection parts 31 are formed of a metal film.

As illustrated in FIG. 4, each tactile sensation generation column electrode 5 is configured by a combined structure of a plurality of tactile sensation generation column electrode principal parts 50 (second tactile sensation generation principal parts) and a plurality of tactile sensation generation column electrode intersection parts 51 (second tactile sensation generation intersection parts).

The tactile sensation generation column electrode principal parts 50 have a generally square rhombus shape in a plan view and each have two pairs of opposing angular portions that are respectively arranged in the row and column directions. The tactile sensation generation column electrode intersection parts 51 extend in the column direction and have a width that is sufficiently narrower in the row direction than a maximum width of the tactile sensation generation column electrode principal parts 50.

Each adjacent pair of the plurality of tactile sensation generation column electrode principal parts 50 are configured such that upper and lower opposite angles thereof, which are angular portions facing each other in the column direction, are connected by the tactile sensation generation column electrode intersection parts 51. The tactile sensation generation column electrode intersection parts 51 are formed of a metal film.

In this way, the detection electrode principal parts 30, the tactile sensation generation row electrode principal parts 40, and the tactile sensation generation column electrode principal parts 50, which are principal parts of the detection electrodes 3, the tactile sensation generation row electrodes 4, and the tactile sensation generation column electrodes 5, have similar rhombus shapes in a plan view and are arrayed in a plane at a uniform intervals (gap) without overlapping with one another in a plan view as illustrated in FIG. 2.

In each of the electrodes 3 to 5 on the front side of the transparent substrate, an insulating part made of an interlayer insulation film exists between the tactile sensation generation row electrode intersection parts 41 of the tactile sensation generation row electrodes 4, which are formed as a first wiring layer serving as a lower wiring layer, and the detection electrode intersection parts 31 of the detection electrodes 3 and the tactile sensation generation column electrode intersection parts 51 of the tactile sensation generation column electrodes 5, which are formed as a second wiring layer serving as an upper wiring layer. This configuration allows the detection electrodes 3, the tactile sensation generation row electrodes 4, and the tactile sensation generation column electrodes 5 to intersect with one another in a plan view without having electrical continuity between the detection electrodes 3 and the tactile sensation generation row electrodes 4 and between the tactile sensation generation column electrodes 5 and the tactile sensation generation row electrodes 4. Note that the layer structure will be described later.

Figure 5:
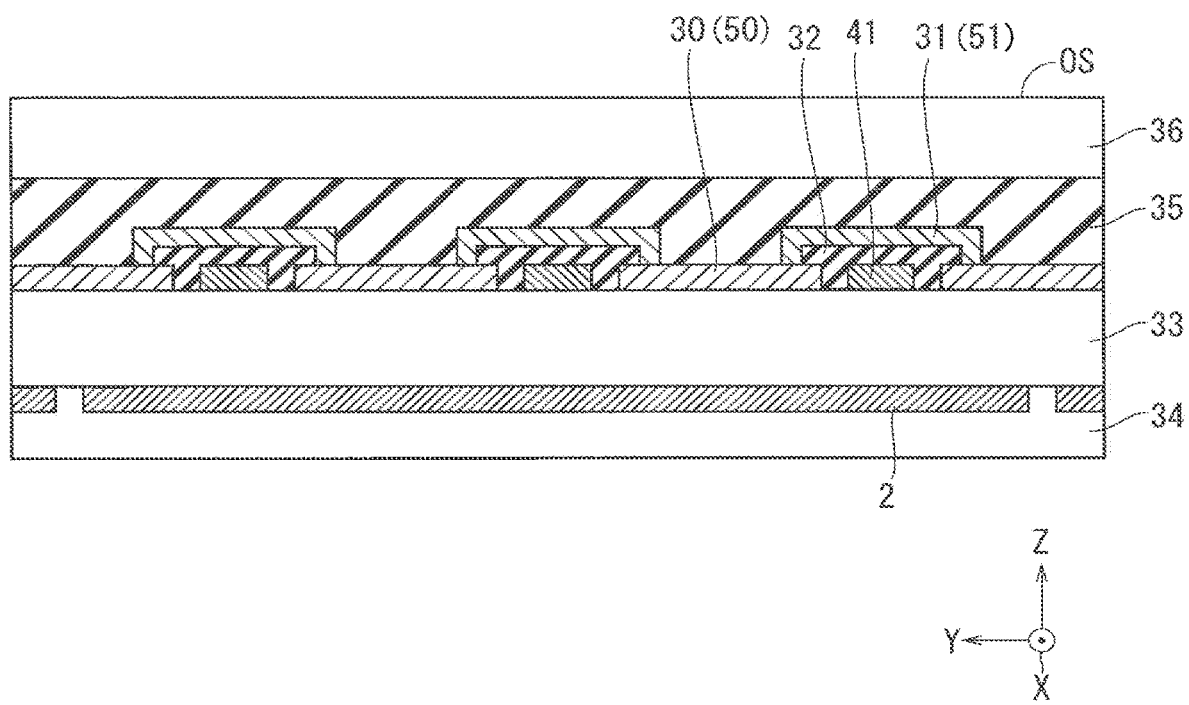
FIG. 5 is a cross-sectional vie schematically illustrating a cross-sectional configuration taken along line A-A in FIG. 2.

Next, the stacked structure of the electrodes 2 to 5 will be described. FIG. 5 is a cross-sectional view schematically illustrating a cross-sectional configuration taken along line A-A in FIG. 2. Note that numerical values within the parentheses in FIG. 5 indicate the case of a cross-sectional configuration taken along line B-B in FIG. 2. As illustrated in FIG. 5, the excitation electrodes 2 are formed of a transparent conductive film on the back surface of the glass substrate 33, which is a transparent substrate, and a transparent protective film 34 is further formed to cover the excitation electrodes 2.

The whole of the tactile sensation generation row electrodes 4 (only the tactile sensation generation row electrode intersection parts 41 are illustrated in FIG. 5), the principal parts 30 of the detection electrodes 3, and the principal parts 50 of the tactile sensation generation column electrodes 5 are formed of a transparent conductive film as the first wiring layer on the front surface of the glass substrate 33.

That is, the detection electrode principal parts 30, the tactile sensation generation row electrode intersection parts 41, and the tactile sensation generation column electrode principal parts 50 are formed to the same height along with the tactile sensation generation row electrode principal parts 40, and therefore, can be manufactured simultaneously as the first wiring layer.

Then, an insulation film 32 made of a transparent interlayer insulation film, such as silicon nitride, is formed in the vicinity of the upper and lower opposite angles of the detection electrode principal parts 30 and the tactile sensation generation row electrode principal parts 40 to cover the tactile sensation generation row electrode intersection parts 41.

Moreover, the detection electrode intersection parts 31 (tactile sensation generation column electrode intersection parts 51) made of a metal film are formed over the insulation film 32 to couple the detection electrode principal parts 30 (tactile sensation generation column electrode principal parts 50) and provide electrical continuity therebetween.

In this way, the detection electrode intersection parts 31 and the tactile sensation generation column electrode intersection parts 51 on the insulation film 32 are formed after the first wiring layer and formed to a height higher than the height of the first wiring layer. Thus, the detection electrode intersection parts 31 and the tactile sensation generation column electrode intersection parts 51 are included in the second wiring layer that needs to be manufactured in another manufacturing step different from that of the first wiring layer.

In the present embodiment which adopts the aforementioned second method, a high-resistance, transparent charge storage layer 35 for storing electrical charges is further formed in a layer above the detection electrodes 3, the tactile sensation generation row electrodes 4, and the tactile sensation generation column electrodes 5, and a transparent protective film 36 is further formed in a layer above the charge storage layer 35, in order to generate tactile sensation from static electricity. The surface of this protective film 36 is an operation screen OS to be operated by the indicator such as a finger.

Note that a layer consisting primarily of tin oxide and titanium oxide is, for example, known as the charge storage layer 35.

In this way, the detection electrodes 3, the tactile sensation generation row electrodes 4, and the tactile sensation generation column electrodes 5 are respectively configured by a combined structure of the principal parts 30, 40, or 50 and the intersection parts 31, 41, or 51 having a narrower width in the row or column direction than the principal parts.

The whole of the tactile sensation generation row electrodes 4 is formed as the first wiring layer on the front side of the glass substrate 33, and at least the principal parts 30 of the detection electrodes 3 and at least the principal parts 50 of the tactile sensation generation column electrodes 5 are formed as the first wiring layer.

The plurality of detection electrode principal parts 30 and the plurality of tactile sensation generation column electrode principal parts 50 are arranged at an equal interval in the column direction, and the tactile sensation generation row electrode principal parts 40 are arranged at an equal interval in the row direction. Thus, the detection electrode principal parts 30, the tactile sensation generation row electrode principal parts 40, and the tactile sensation generation column electrode principal parts 50 are spaced from one another without overlapping with one another in a plan view, as illustrated in FIGS. 2 to 4.

As described above, in the touch screen 1 according to Embodiment 1, the plurality of excitation electrodes 2, each disposed along the row direction, are provided on the back surface of the glass substrate 33, and the plurality of detection electrodes 3, each disposed along the column direction, the plurality of tactile sensation generation row electrodes 4, each disposed along the row direction, and the plurality of tactile sensation generation column electrodes 5, each disposed along the column direction, are provided on the front surface of the glass substrate 33, and the front side of the glass substrate 33 is defined as the operation screen OS. At this time, the excitation electrodes 2 and the tactile sensation generation row electrodes 4 are formed independently of each other, and the detection electrodes 3 and the tactile sensation generation column electrodes 5 are formed independently of each other. The above-described configuration defines an interelectrode positional relationship in which, among the excitation electrodes 2, the detection electrodes 3, the tactile sensation generation row electrodes 4, and the tactile sensation generation column electrodes 5, the excitation electrodes 2 are situated furthest from the operation screen OS.

Touch Panel Device

Figure 7:
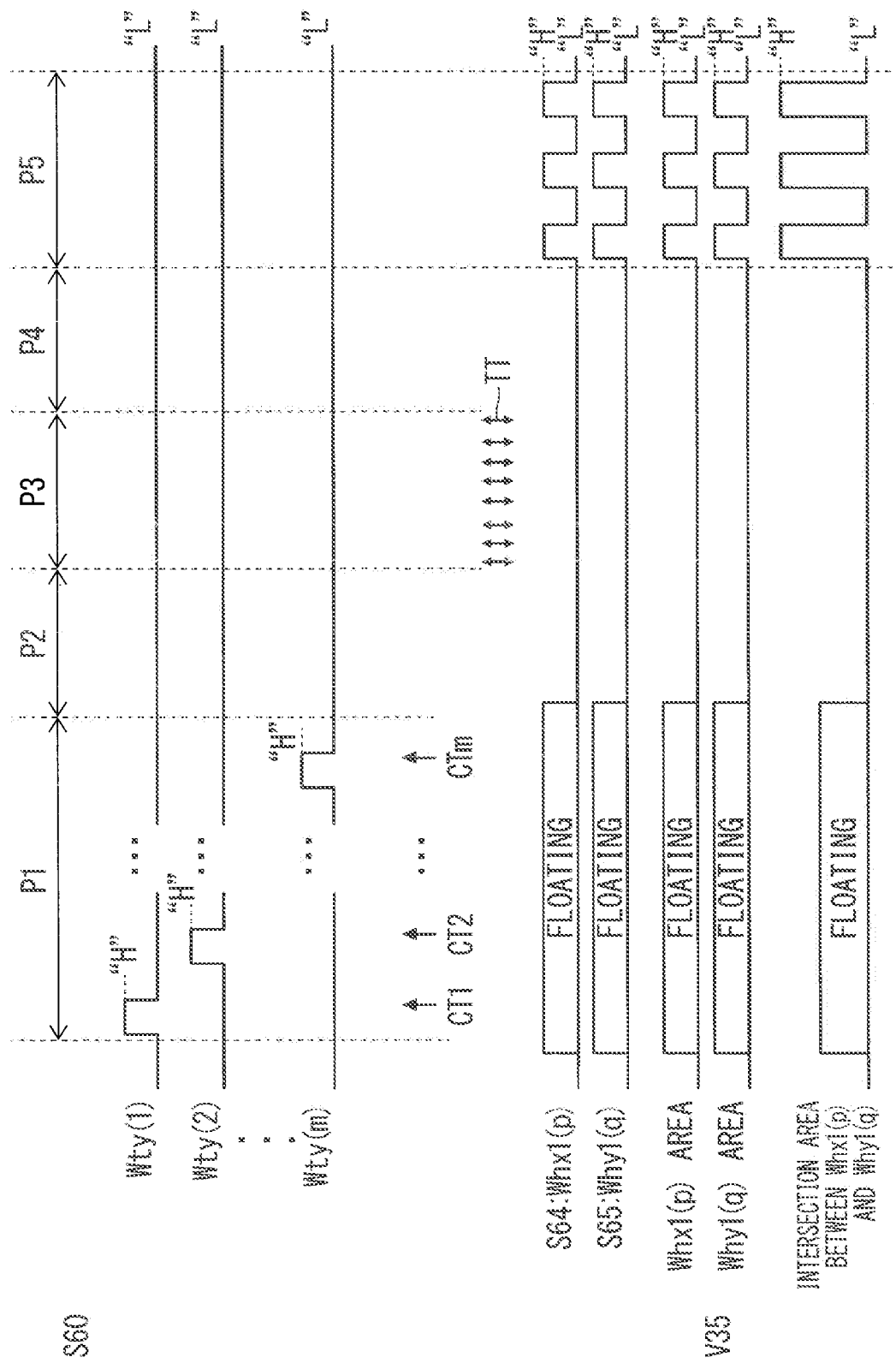
FIG. 7 is a timing chart illustrating timings of schematic operations of the touch panel device according to Embodiment 1.

Next is a description of operations of a touch panel device that includes the touch screen 1 having a tactile sensation generating function according to Embodiment 1. FIG. 6 is a Nock diagram illustrating a configuration of the touch panel device having a tactile sensation generating function according to Embodiment 1. FIG. 7 is a timing chart illustrating timing of schematic operations of the touch panel device according to Embodiment 1. FIG. 7 illustrates a case in which the touch screen 1 is configured by m excitation electrodes 2, m tactile sensation row electrode groups 6, and n column electrode groups 7.

Each of the n column electrode groups 7 consists of a tactile sensation generation column electrode Whx1($i$), a detection electrode Wtx(i), and a tactile sensation generation column electrode Whx3($i$), where i is any integer from 1 to n.

Each of the m tactile sensation row electrode groups 6 consists of a tactile sensation generation row electrode Why1($j$), a tactile sensation generation row electrode Why2($j$), and a tactile sensation generation row electrode Why3($j$), where j is any integer from 1 to m.

The touch panel device according to Embodiment 1 includes, as control circuit parts of the touch screen 1, a touch detection circuit part 67 configured to control the touch detection operation, and a tactile sensation voltage generating circuit part 68 configured to control the operation of generating the tactile sensation generation signals.

The touch detection circuit part 67 includes an excitation pulse generating circuit 60, a charge detection circuit 61, a touch-coordinate calculation circuit 62, and a touch-detection control circuit 63.

The excitation pulse generating circuit 60 sequentially generates m excitation pulse signals S60. The charge detection circuit 61 detects electrical charges that correspond to the n column electrode groups 7 on the basis of the signals obtained from the detection electrodes 3 of the n column electrode groups 7, to output a charge detection result D61 (electrostatic-capacitance derived data). The charge detection result D61 is a value that corresponds to mutual capacitances between the excitation electrode 2 that has received the excitation pulse signal S60 and the n detection electrodes 3. Note that the charge detection circuit 61 can recognize the excitation electrode 2 to which the excitation pulse signal S60 is applied from among the plurality of excitation electrodes 2, on the basis of the control signal received from the touch-detection control circuit 63.

The touch-coordinate calculation circuit 62 calculates coordinates of a position touched by the indicator such as a finger on the basis of the charge detection result D61 to obtain detected coordinate data D62, and outputs this detected coordinate data D62 to the outside and the tactile sensation voltage generating circuit part 68. The touch-detection control circuit 63 controls the operations of the excitation pulse generating circuit 60, the charge detection circuit 61, and the touch-coordinate calculation circuit 62.

On the other hand, the tactile sensation voltage generating circuit part 68 includes a tactile sensation voltage generating circuit 64, a tactile sensation voltage generating circuit 65, and a tactile sensation generation control circuit 66.

The tactile sensation voltage generating circuit 64 outputs a tactile sensation generation signal S64 (second tactile sensation generation signal) to the n tactile sensation generation column electrodes Whx1(1) to Whx1($n$), and the tactile sensation voltage generating circuit 65 outputs a tactile sensation generation signal S65 (first tactile sensation generation signal) to the m tactile sensation generation row electrodes Why1(1) to Why1($m$).

The tactile sensation generation control circuit 66 controls the operations of the tactile sensation voltage generating circuit 64 and the tactile sensation voltage generating circuit 65 on the basis of the detected coordinate data D62.

The operations of the touch panel device with this configuration will now be described.

First, in a touch detection period P1, the excitation pulse generating circuit 60 applies an excitation pulse signal S60 (excitation pulse signal; charging pulse signal) to the first excitation electrode Wty(1) at conversion timing CT1 according to the touch detection control signal received from the touch-detection control circuit 63 so as to charge the interelectrode capacitances (mutual capacitances) between the excitation electrode Wty(1) and each of the detection electrodes Wtx(1) to Wtx(n) that intersect with the excitation electrode Wty(1) in a plan view. Then, the electric-charge detection circuit 61 detects the electrical charges via each detection electrode Wtx(i), subjects the electrical charges to analog-digital (A/D) conversion, and outputs the charge detection result D61 corresponding to the mutual capacitances for the excitation electrode Wty(1), i.e., the first row, to the touch-coordinate calculation circuit 62.

Similarly, the excitation pulse generating circuit 60 sequentially applies the excitation pulse signals S60 to the second (excitation electrode Wty(2)) and subsequent excitation electrodes at conversion timing CT2 to CTm. Then, the electric-charge detection circuit 61 detects electrical charges in the mutual capacitances between the excitation electrode Wty(j) and each detection electrode Wtx(i) that intersects with the excitation electrode Wty(j), subjects the electrical charges to A/D conversion, and outputs the charge detection result D61 corresponding to the mutual capacitances for the target row to the touch-coordinate calculation circuit 62.

Next, during a touch coordinate calculation period P2, the touch-coordinate calculation circuit 62 determines whether the screen has been touched by the indicator such as the operator's finger, on the basis of the charge detection results D61 that are input and stored from the charge detection circuit 61 and correspond to the mutual capacitances at all intersections between the excitation electrodes 2 and the detection electrodes 3. When it is determined that the screen has been touched, the touch-coordinate calculation circuit 62 calculates the touch coordinates to obtain the detected coordinate data D62 on the basis of the charge detection result D61 from which it is determined that the screen has been touched.

When the indicator such as a finger has approached or contacted the screen, electric field coupling between the excitation electrodes 2 and the detection electrodes 3 is relieved, and the electrical charges in the mutual capacitances decrease. Thus, the touch-coordinate calculation circuit 62 can determine whether the screen has been touched, by determining the degree of decrease in mutual capacitance on the basis of the degree of decrease in the charge detection result D61 corresponding to the mutual capacitances.

Then, when it is determined that the screen has been touched, the touch-coordinate calculation circuit 62 can calculate the touch coordinates to obtain the detected coordinate data D62 by, for example, performing computational processing, such as a gravity operation, using the results of detection of an intersection (intersection grid) at which the degree of decrease of the charge detection result D61 is maximum and peripheral intersection grids.

In the touch detection period P1, the touch-detection control circuit 63 also transmits the tactile sensation voltage generation control signal to the tactile sensation voltage generating circuit 64 and the tactile sensation voltage generating circuit 65.

On the basis of the tactile sensation voltage generation control signal from the touch-detection control circuit 63, in the touch detection period P1, the tactile sensation voltage generating circuit 64 interrupts the electrical connections with all of the tactile sensation generation column electrodes 5 so as to bring all of the tactile sensation generation column electrodes 5 to a floating state. Similarly, on the basis of the tactile sensation voltage generation control signal from the touch-detection control circuit 63, in the touch detection period P1, the tactile sensation voltage generating circuit 65 interrupts the electrical connections with all of the tactile sensation generation row electrodes 4 so as to bring all of the tactile sensation generation row electrodes 4 to a floating state.

That is, all of the tactile sensation generation column electrodes Whx1(1) to Whx1(n) and Whx3(1) to Whx3(n) and all of the tactile sensation generation row electrodes Why1(1) to Why1(m), Why2(1) to Why2(m), and Why3(1) to Why3(m) are set to a floating state.

The above-described operations of the tactile sensation voltage generating circuits 64 and 65 can prevent the tactile sensation generation row electrodes 4 and the tactile sensation generation column electrodes 5 from shielding the electric field between the excitation electrodes 2 and the detection electrodes 3 during the touch detection period P1, and can suppress a reduction in the degree of change in mutual capacitance between the excitation electrodes 2 and the detection electrodes 3, i.e., a reduction in touch detection sensitivity, that may be caused by the touch operation of the indicator.

When the touch-coordinate calculation circuit 62 has determined that the screen has been touched by the indicator, the touch-coordinate calculation circuit 62 calculates the detected coordinate data D62, and in a touch-coordinate transmission period P3, transmits the detected coordinate data D62 to the outside of the device in accordance with touch-coordinate-data transmission timing TT given from the touch-detection control circuit 63. At this time, the detected coordinate data D62 is also output to the tactile sensation generation control circuit 66.

While the timing chart illustrated in FIG. 7 shows the case of determining that the screen has been touched, if it is determined that the screen has not been touched, the calculation of the touch coordinates is not performed, and the procedure returns to the touch detection period P1. To enable this processing, the touch-coordinate calculation circuit 62 gives a signal that indicates the result of determination as to whether the screen has been touched, to the touch-detection control circuit 63.

In this way, the touch detection circuit part 67 executes a series of operations for calculating the touch coordinates by using the excitation electrodes 2 and the detection electrodes 3 of the touch screen 1, the operations involving acquiring the charge detection results D61, determining whether the screen has been touched, and when it is determined that the screen has been touched, outputting the detected coordinate data D62.

In a tactile sensation application determination period P4 for the case where the touch detection circuit part 67 has determined that the screen was touched and has calculated the detected coordinate data D62, the tactile sensation generation control circuit 66 determines which ones of the plurality of tactile sensation generation row electrodes 4 and the plurality of tactile sensation generation column electrodes 5 are in the vicinity of the touched position, on the basis of the received detected coordinate data D62. Here, a case is assumed in which the touched position is in the vicinity of a tactile sensation generation column electrode Whx1($p$), where p is any integer from 1 to n, and a tactile sensation generation row electrode Why1($q$), where q is any integer from 1 to m. That is, the tactile sensation generation row electrode Why1($q$) and the tactile sensation generation column electrode Whx1($p$) are respectively first and second selected tactile sensation generation electrodes.

Note that the tactile sensation generation control circuit 66 may use the charge detection results D61 corresponding to the mutual capacitances, instead of the calculated detected coordinate data D62, to determine that the touched position is in the vicinity of the tactile sensation generation column electrode Whx1($p$) and the tactile sensation generation row electrode Why1($q$).

That is, the tactile sensation generation control circuit 66 may determine the tactile sensation generation column electrode Whx1($p$) and the tactile sensation generation row electrode Why1($q$) on the basis of at least one of the charge detection results D61 and the detected coordinate data D62.

The tactile sensation generation control circuit 66 outputs a tactile sensation generation control signal to the tactile sensation voltage generating circuit 64 so as to apply a tactile sensation generation signal to the tactile sensation generation column electrode Whx1($p$), and similarly outputs a tactile sensation generation control signal to the tactile sensation voltage generating circuit 65 so as to apply a tactile sensation generation signal to the tactile sensation generation row electrode Why1($q$) in the vicinity of the touched position.

Then, the tactile sensation voltage generating circuit 64 and the tactile sensation voltage generating circuit 65 respectively apply the tactile sensation generation signals S64 and S65 to the tactile sensation generation column electrode Whx1($p$) and the tactile sensation generation row electrode Why1($q$). Here, the tactile sensation generation signals S64 and S65 are both pulse signals of a predetermined width having a considerably high peak voltage (tactile sensation generation voltage) set to the "H" pulse as compared with the excitation electrodes 2 and the detection electrodes 3, which both have a voltage of several tens of volts. At this time, charge-storage-layer applied potentials V35 in an area of the charge storage layer 35 that is located immediately above the tactile sensation generation column electrode Whx1($p$) and in an area of the charge storage layer 35 that is located immediately above the tactile sensation generation row electrode Why1($q$) are charged to high voltages during a period when the pulse signals of the tactile sensation generation signals are at the "H" level and the tactile sensation generation voltage is generated, whereas the stored electrical charges are discharged during a period when the pulse signals of the tactile sensation generation signals are at the "L" level.

As illustrated in FIG. 7, the area in the vicinity of the intersection area of the tactile sensation generation column electrode Whx1(p) and the tactile sensation generation row electrode Why1(q) is repeatedly charged and discharged to a pulse voltage having a peak voltage that is approximately two times the "H" level of the pulse signals of the electrodes Why1(q) and Whx1(p), due to capacitive coupling. At this time, tactile sensation is generated by static electricity between the charged charge storage layer 35 and the finger.

It is noted here that tactile sensation can be provided to the finger, which is touching the area in the vicinity of the intersection area of the tactile sensation generation column electrode Whx1(p) and the tactile sensation generation row electrode Why1(q), by setting the tactile sensation generation voltage such that a finger tactile threshold value for the pulse signal of each electrode becomes a value between the H" level of the tactile sensation generation signal and a charging voltage that is approximately two times the "H" level. Note that the cycle of generation of pulse signals of the tactile sensation generation signals S64 and S65 and the period of application of the pulse signals are appropriately set according to the tactile sensation that is desired to be provided. Alternatively, the tactile sensation generation signals S64 and S65 may be sinusoidal signals instead of pulse signals.

After the tactile sensation generation signal application period P5, the procedure returns to the operation in the touch detection period P1. In this way, the touch panel device according to the present embodiment repeats a series of operations in accordance with whether the screen has been touched.

As described above, the tactile sensation voltage generating circuit part 68 performs a series of tactile sensation voltage generating operations that involve determining the tactile sensation generation column electrode Whx1(p) and the tactile sensation generation row electrode Why1(j) to which the tactile sensation generation signals are to be applied, from among the plurality of tactile sensation generation row electrodes 4 and the plurality of tactile sensation generation column electrodes 5 of the touch screen 1, and applying the tactile sensation generation signals S64 and S65 having their "H" level set to the tactile sensation generation voltage to the tactile sensation generation column electrode Whx1(p) and the tactile sensation generation row electrode Why1(j).

The tactile sensation generation control circuit 66 suppresses a reduction in tactile sensation that is provided to the indicator such as a finger, by applying the control signal to the charge detection circuit 61 during the tactile sensation generation signal application period P5 and setting all of the detection electrodes Wtx(1) to Wtx(n) to a floating state to disable the shielding function of the detection electrodes Wtx(1) to Wtx(n) against the electric field.

During the tactile sensation generation signal application period P5, the excitation electrodes 2 on the back side of the glass substrate 33, which are transparent electrodes, are fixed at low impedance to the GND potential outside the touch screen 1 and function as shield electrodes against the tactile sensation generation signals having their "H" levels set to high tactile sensation generation voltages. It is thus possible to prevent the tactile sensation generation signals with their "H" levels set to high tactile sensation generation voltages from entering, as noise, the display panel, which is ordinarily incorporated and arranged on the back side of the glass substrate 33 in the touch panel device, and to thereby prevent the occurrence of display problems such as unevenness in display.

Note that the n excitation electrodes 2 may be fixed to a potential other than the GND potential as long as they are fixed at low impedance.

As described above, the touch panel device according to Embodiment 1 includes, in addition to the touch screen 1, the touch detection circuit part 67 and the tactile sensation voltage generating circuit part 68.

The touch detection circuit part 67 determines whether the operation screen OS has been touched by an indicator on the basis of the charge detection results D61, which correspond to the mutual capacitances between the plurality of excitation electrodes 2 and the plurality of detection electrodes 3, while selectively applying the excitation pulse signals S60 to the plurality of excitation electrodes 2, and when having determined that the operation screen was touched, computes the touch coordinates on the operation screen OS on the basis of the electric-charge detection results D61 to obtain the detected coordinate data D62.

On the other hand, the tactile sensation voltage generating circuit part 68 determines a tactile sensation generation row electrode 4 and a tactile sensation generation column electrode 5, to which the tactile sensation generation signals are applied, as the selected tactile sensation generation row electrodes 4 and the selected tactile sensation generation column electrode 5 from among the plurality of tactile sensation generation row electrodes 4 and the plurality of tactile sensation generation column electrodes 5 on the basis of the detected coordinate data D62 obtained by the touch detection circuit part 67, and applies the tactile sensation generation signals to the selected tactile sensation generation row electrode 4 and the selected tactile sensation generation column electrode 5.

In this way, the touch panel device including the tactile sensation voltage generating circuit part 67 and the tactile sensation voltage generating circuit part 68 according to Embodiment 1, the charge detection circuit 61 detects the charge detection results D61 (electrostatic-capacitance derived data) corresponding to mutual capacitances by using the excitation electrodes 2 and the detection electrodes 3 of the touch screen 1, and the touch-coordinate calculation circuit 62 determines whether the screen has been touched, on the basis of the degree of change of the electric-charge detection results D61. When it is determined that the screen has been touched, the touch-coordinate calculation circuit 62 calculates the detected coordinate data D62. On the basis of the detected coordinate data D62, the tactile sensation voltage generating circuit part 68 provides tactile feedback upon receipt of the input operation via the operator's finger by applying the tactile sensation generation signals to the selected tactile sensation generation row electrode 4 and the selected tactile sensation generation column electrode 5, which correspond to the touch coordinates, and charging the charge storage layer 35 in the vicinity of the intersection area of the selected tactile sensation generation row electrode 4 and the selected tactile sensation generation column electrode 5 to a value exceeding the tactile threshold value so as to provide tactile sensation to the finger.

As described above, in the present embodiment, the excitation electrodes 2, which are set to a low impedance state and serve as the first touch detection electrodes provided on the back surface of the glass substrate 33, can shield the detection electrodes 3, the tactile sensation generation row electrodes 4, and the tactile sensation generation column electrodes 5, which are respectively the second touch detection electrodes, the first tactile sensation generation electrodes, and the second tactile sensation generation electrodes provided on the front surface of the glass substrate 33. It is thus possible to suppress intrusion of driving noise from the display panel, which is ordinarily incorporated and arranged on the back side of the glass substrate 33, into the detection electrodes 3, and to further suppress intrusion of the tactile sensation generation signals, which are applied to the selected tactile sensation generation row electrode 4 and the selected tactile sensation generation column electrode 5, as noise into the display panel and thereby suppress the occurrence of display problems such as unevenness in display.

Since the excitation electrodes 2, the tactile sensation generation row electrodes 4, the detection electrodes 3, and the tactile sensation generation column electrodes 5 are not shared with one another and thus completely independent of one another, there is no need for additional constituent elements such as a switching circuit with high breakdown voltage, which may be necessary to conduct or interrupt the tactile sensation generation signals, and therefore the circuit configuration of the touch panel device can be simplified.

In addition, the first pitch in the column direction between the excitation electrodes 2 and the second pitch in the row direction between the detection electrodes 3, which are set on the basis of the desired precision of the touch coordinates, can be respectively set different from the third pitch in the column direction between the tactile sensation generation row electrodes 4 and the fourth pitch in the row direction between the tactile sensation generation column electrodes 5, which are set on the basis of the desired tactile sensation resolution. Accordingly, it is possible to avoid situations such as where any of the interelectrode pitches among the first and second pitches and the third and fourth pitches may be set unnecessarily narrow, which makes the device configuration complicated, or where any of the interelectrode pitches may be set unnecessarily wide, which sacrifices the precision of the touch coordinates or the tactile sensation generation resolution.

The detection electrodes 3, the tactile sensation generation row electrodes 4, and the tactile sensation generation column electrodes 5 are formed directly on the front surface of the glass substrate 33, which is a single transparent substrate, and the excitation electrodes 2 are formed directly on the back surface of the glass substrate. This configuration allows the thickness in the height direction (Z direction in FIGS. 1 to 5) of the touch screen to be reduced as compared with cases such as where the configuration includes two substrates, one for the excitation electrodes 2 and the detection electrodes 3 and the other for the tactile sensation generation row electrodes 4 and the tactile sensation generation column electrodes 5.

Moreover, the structure of the touch panel 1 can be simplified because at least the detection electrode principal parts 30 of the detection electrodes 3, at least the tactile sensation generation column electrode principal parts 50 of the tactile sensation generation column electrodes 5, and the tactile sensation generation row electrodes 4 including the tactile sensation generation row electrode principal parts 40 are formed to the same height and therefore can be formed simultaneously as the same wiring layer (first wiring layer). This configuration can further simplify the manufacturing process of the touch screen 1 and reduce cost.

The detection electrode principal parts 30 of the detection electrodes 3, the tactile sensation generation row electrode principal parts 40 of the tactile sensation generation row electrodes 4, and the tactile sensation generation column electrode principal parts 50 of the tactile sensation generation column electrodes 5 on the front surface of the glass substrate 33 are arranged without overlapping with one another in a plan view. This configuration can suppress situations such as where the presence of the tactile sensation generation row electrodes 4 and the tactile sensation generation column electrodes 5 may inhibit a change in interelectrode capacitance (mutual capacitance) between the excitation electrodes 2 and the detection electrodes 3, the change occurring when the indicator such as the operator's finger has approached or contacted the screen. It is thus possible to suppress a reduction in the touch detection sensitivity of the touch panel device including the touch screen 1.

Since the detection electrode principal parts 30, the tactile sensation generation row electrode principal parts 40, and the tactile sensation generation column electrode principal parts 50 are arranged without overlapping with one another in a plan view, a reduction in display light transmittance can be suppressed.

The excitation electrodes 2 have a rectangular shape in a plan view and each are disposed so as to completely overlap with three (k) tactile sensation generation row electrodes 4 in a plan view. This configuration can improve the shielding effect of the excitation electrodes 2 against the tactile sensation generation row electrodes 4 and can more effectively suppress intrusion of the tactile sensation generation signals, which are applied to the tactile sensation generation row electrodes 4, as noise into the display panel and thereby more effectively suppress the occurrence of display problems such as unevenness in display.

Since the excitation electrodes 2 and the tactile sensation generation row electrodes 4 are arrayed regularly such that the integer ratio of the first pitch, which is the array pitch in the column direction of the excitation electrodes 2, and the third pitch, which is the array pitch in the column direction of the tactile sensation generation row electrodes 4 becomes 3:1, there is no unevenness in transmittance due to uneven overlaps of the excitation electrodes 2 and the tactile sensation generation row electrodes 4. As a result, it is possible to suppress a situation where the electrodes 2 and 4 are visually recognized due to the presence of uneven overlaps of the electrodes.

Since at least the plurality of principal parts 30, 40, and 50 of the detection electrodes 3, the tactile sensation generation row electrodes 4, and the tactile sensation generation column electrodes 5 on the front surface of the glass substrate 33 are arrayed regularly without overlapping with one another in a plan view, there is no unevenness in transmittance due to uneven overlaps of the excitation electrodes 2, which are provided on the back surface of the glass substrate 33, and the detection electrodes 3, the tactile sensation generation row electrodes 4, and the tactile sensation generation column electrodes 5, which are provided on the surface of the glass substrate 33. As a result, it is possible to suppress a situation where the electrodes 2 to 4 are visually recognized due to the presence of uneven overlaps of the electrodes.

In the touch detection period P1, the tactile sensation voltage generating circuit part 68 sets all of the tactile sensation generation row electrodes 4 and the tactile sensation generation column electrodes 5 to a floating state. This presents the tactile sensation generation row electrodes 4 and the tactile sensation generation column electrodes 5 from shielding the electric field formed between the excitation electrodes 2 and the detection electrodes 3, and suppresses a reduction in the degree of change in mutual capacitance between the excitation electrodes 2 and the detection electrodes 3, i.e., a reduction in touch detection sensitivity, which may be caused by the touch operation.

Embodiment 2

In order to improve the shielding effect of the excitation electrodes 2, which are provided on the back side of the glass substrate 33 as a transparent substrate, against the tactile sensation generation signals, it is desirable to reduce the electrode resistance of the excitation electrodes 2. While the excitation electrodes 2 in Embodiment 1 are formed of a transparent conductive film, it is necessary to increase the thickness of the transparent conductive film in order to reduce the electrode resistance. However, if the thickness of the transparent conductive film is increased, the display light transmittance may decrease or the short wavelength portions of the display light may be absorbed, which makes the screen more remarkably take on a yellow tinge.

In view of this, a touch screen 1B according to Embodiment 2 adopts a mode in which the excitation electrodes 2 are configured by a fine metal wiring mesh structure.

Figure 8:
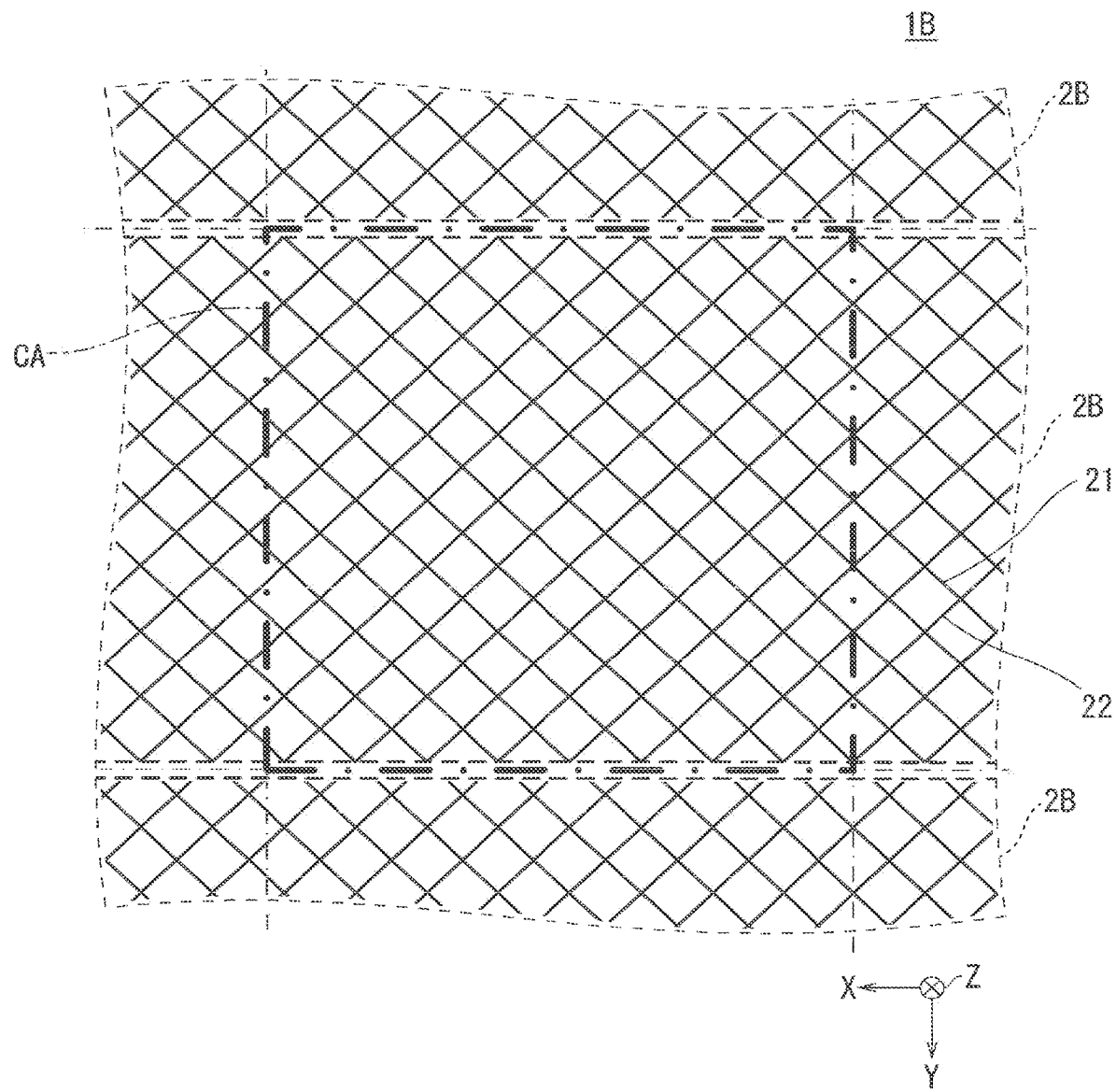
FIG. 8 is a plan view illustrating a configuration of an excitation electrode viewed from the back side of a touch screen according to Embodiment 2.

FIG. 8 is a plan view illustrating a configuration of excitation electrodes 2B viewed from the back side of the touch screen 1B. Note that the touch screen 1B has a configuration similar to that of the touch screen 1 according to Embodiment 1, except in the configuration of the excitation electrodes 2B.

Figure 9:
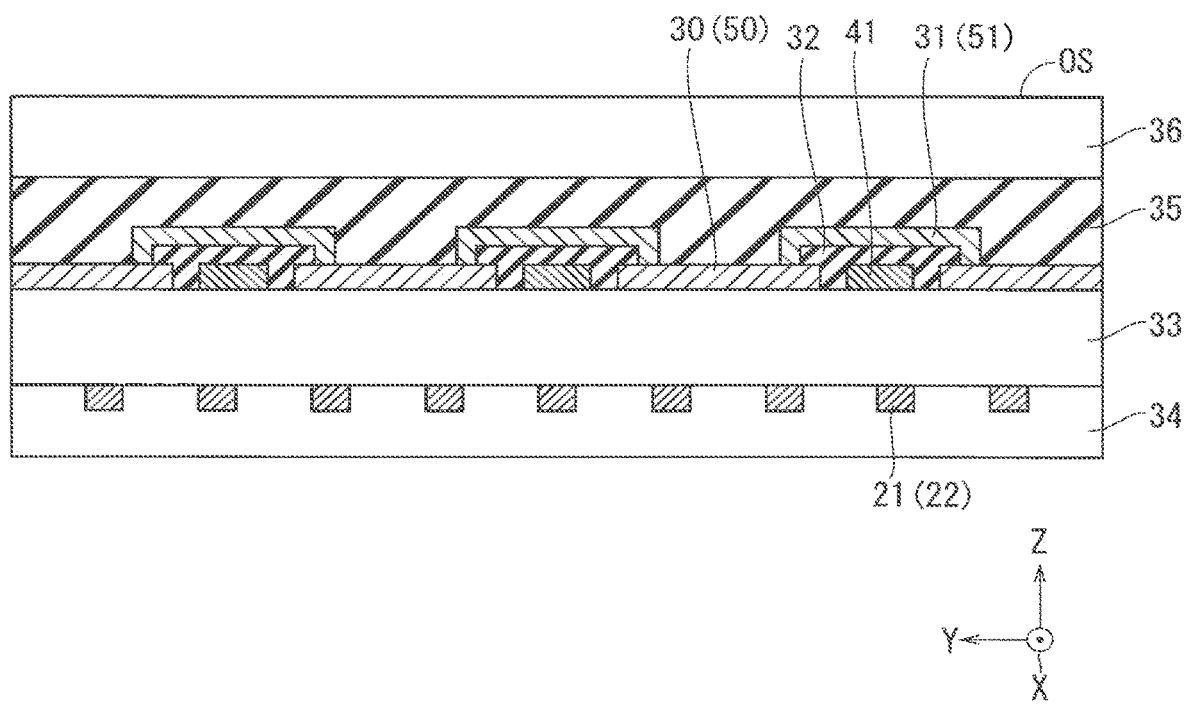
FIG. 9 is a cross-sectional view illustrating a cross-sectional configuration of the excitation electrode according to Embodiment 2.

FIG. 9 is a cross-sectional view illustrating a cross-sectional structure of the touch screen 1B illustrated in FIG. 8. FIG. 9 is a cross-sectional view schematically illustrating a configuration that corresponds to a cross-section taken along line A-A in FIG. 2. According to Embodiment 2, as illustrated in FIG. 9, the excitation electrodes 2B formed on the back surface of the glass substrate 33, which is a transparent substrate, have a metal wiring mesh structure configured by two metal mesh inclined straight portions 21 and 22 of fine metal wiring.

Here, the metal mesh inclined straight portions 21 are a plurality of metal lines that extend in a direction at −45 degrees (upper left direction) with respect to the XY plane in FIG. 8, and the metal mesh inclined straight portions 22 are a plurality of metal lines that extend in a direction at +45 degrees (lower left direction) with respect to the XY plane in FIG. 8.

The metal mesh inclined straight portions 21 and 22 are inclined approximately 45 degrees with respect to the row and column directions and are orthogonal to each other. Thus, the metal mesh inclined straight portions 21 and the metal mesh inclined straight portions 22 intersect with each other in a plan view.

In this way, the directions in which the metal mesh inclined straight portions 21 and 22 are formed, namely, third and fourth directions, are set to directions that intersect with both of the row direction (X direction) in Which the excitation electrodes 2B are formed, and the column direction which is the direction along the widths of the excitation electrodes 2B.

This combination of the metal mesh inclined straight portions 21 and 22 provides the excitation electrodes 2B having a mesh structure provided with grid-like spaces and thus having a low electrical resistance.

In this way, according to Embodiment 2, the electrode resistance of the excitation electrodes 2B can be reduced by making the excitation electrodes 2B have a fine metal wiring mesh structure configured by the metal mesh inclined straight portions 21 and 22. This is because the fine metal wiring of the metal mesh inclined straight portions 21 and 22 have a resistance value that is an order of magnitude lower than the resistance value of the transparent conductive film. It is thus possible to improve the shielding effect of the excitation electrodes 2B against the detection electrodes tactile sensation generation row electrodes 4 and the tactile sensation generation column electrodes 5. Besides, the display light passes through substantially a single-layer transparent conductive film (detection electrodes 3, tactile sensation generation row electrodes 4, or tactile sensation generation column electrodes 5), instead of passing through a two-layer transparent conductive film, and therefore the degree of the yellow tinge, which is a peculiar feature of the transparent conductive film, can be reduced.

According to Embodiment 2, moiré fringes induced by interference with pixel lattices of the display panel incorporated on the back side of the glass substrate 33 can be reduced by providing the excitation electrodes 2B having a metal wiring mesh structure configured by a combination of the metal mesh inclined straight portions 21 and 22, which extend in the third and fourth directions. This is because since the pixel lattices of the display panel on the back side of the glass substrate 33 are ordinarily arranged in the row and column directions (X and Y directions), the metal wiring mesh structure provided with meshes extending in the third and fourth directions can avoid producing an unbalanced effect of interrupting display light of the display panel.

In order to prevent visual recognition of the fine metal wiring configured by the metal mesh inclined straight portions 21 and 22, it is desirable for the metal wiring to have a width of several μm. Examples of the metal material for the metal mesh inclined straight portions 21 and 22 include aluminum and copper.

In Embodiment 2, the configuration and operations of the touch panel device are similar to those of the touch panel device according to Embodiment 1 illustrated in FIGS. 6 and 7, except that the touch screen 1 is replaced by the touch screen 1B.

Embodiment 3

The touch screen 1 according to Embodiment 1 is configured such that the excitation electrodes 2, which are provided on the back surface of the glass substrate 33 as a transparent substrate, shield the detection electrodes 3, the tactile sensation generation row electrodes 4, and the tactile sensation generation column electrodes 5, which are provided on the front side of the glass substrate 33.

Embodiment 3 provides a configuration in which a shield electrode against the lead lines 9, 10, and 11 (lead lines of the first, second, and third types) extending from the detection electrodes 3, the tactile sensation generation row electrodes 4, and the tactile sensation generation column electrodes 5 and the plurality of front-side terminals 12 are further formed on the back side.

Figure 10:
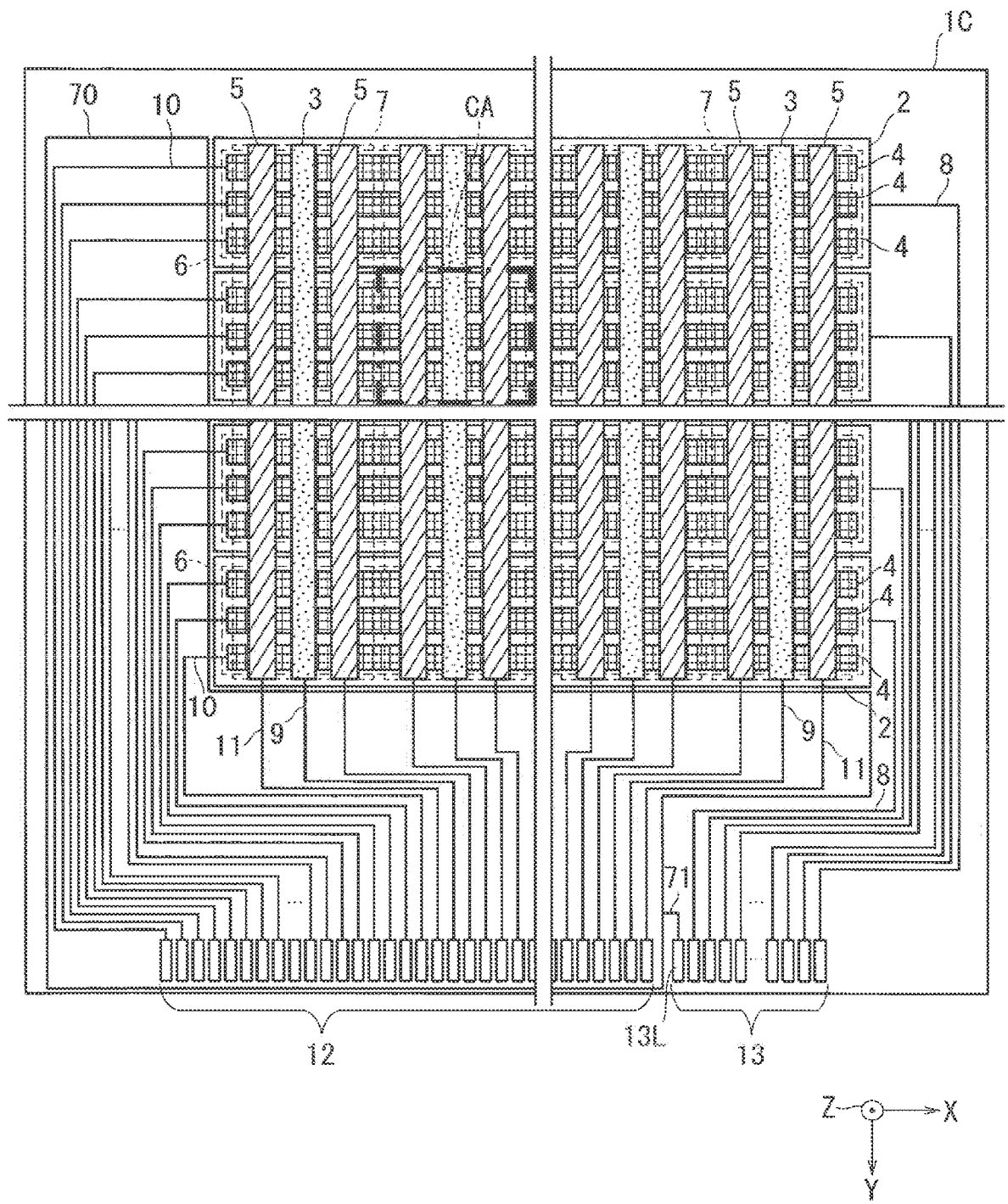
FIG. 10 is a plan view schematically illustrating a configuration of a touch screen according to Embodiment 3 of the present invention.

FIG. 10 is a plan view schematically illustrating a configuration of a touch screen having a tactile sensation generating function according to Embodiment 3 of the present invention. As illustrated in FIG. 10, a shield electrode 70 is formed so as to overlap with the plurality of lead lines 9 to 11, which are electrically connected to the plurality of detection electrodes 3, the plurality of tactile sensation generation row electrodes 4, and the plurality of tactile sensation generation column electrodes 5, in a plan view. The shield electrode 70 according to Embodiment 3 is also configured to overlap with the plurality of front-side terminals 12 in a plan view. Note that constituent elements that are identical to those of Embodiment 1 are given the same reference numerals, and a description thereof will be appropriately omitted.

The shield electrode 70 is formed in the same wiring layer as the excitation electrodes 2 and the back-side terminals 13 on the back surface of the glass substrate 33 and electrically connected to a back-side terminal 13L on the left edge in FIG. 10, among the plurality of back-side terminals 13 for the excitation electrodes 2, via a lead line 71.

The back-side terminal 13L connected to the shield electrode 70 is connected to the GND outside a touch screen 1C. This configuration allows the shield electrode 70 to exhibit the function of shielding the plurality of lead lines 9 to 11, which are electrically connected to the detection electrodes 3, the tactile sensation generation row electrodes 4, and the tactile sensation generation column electrodes 5, and the plurality of front-side terminals 12 (plurality of external connection terminals).

That is, the lead lines 9 of the detection electrode 3 and the front-side terminals 12 connected to the lead lines 9 can be shielded from propagation of driving signals as noise output from the display panel, which is ordinarily incorporated on the back side. Moreover, the display panel can be shielded from propagation of the tactile sensation generation signals as noise, which are applied to the lead lines 10 of the tactile sensation generation row electrodes 4, the lead lines 11 of the tactile sensation generation column electrodes 5, and the front-side terminals 12 connected to the lead lines 10 and 11.

While the excitation electrodes 2 according to Embodiment 1 are illustrated in FIG. 10, the excitation electrodes 2B according to Embodiment 2 may be adopted, instead of the excitation electrodes 2. The configuration and operations of the touch panel device are similar to those of the touch panel device according to Embodiment 1 illustrated in FIGS. 6 and 7, except that the touch screen 1 is replaced by the touch screen 1C.

Embodiment 4

Figure 11:
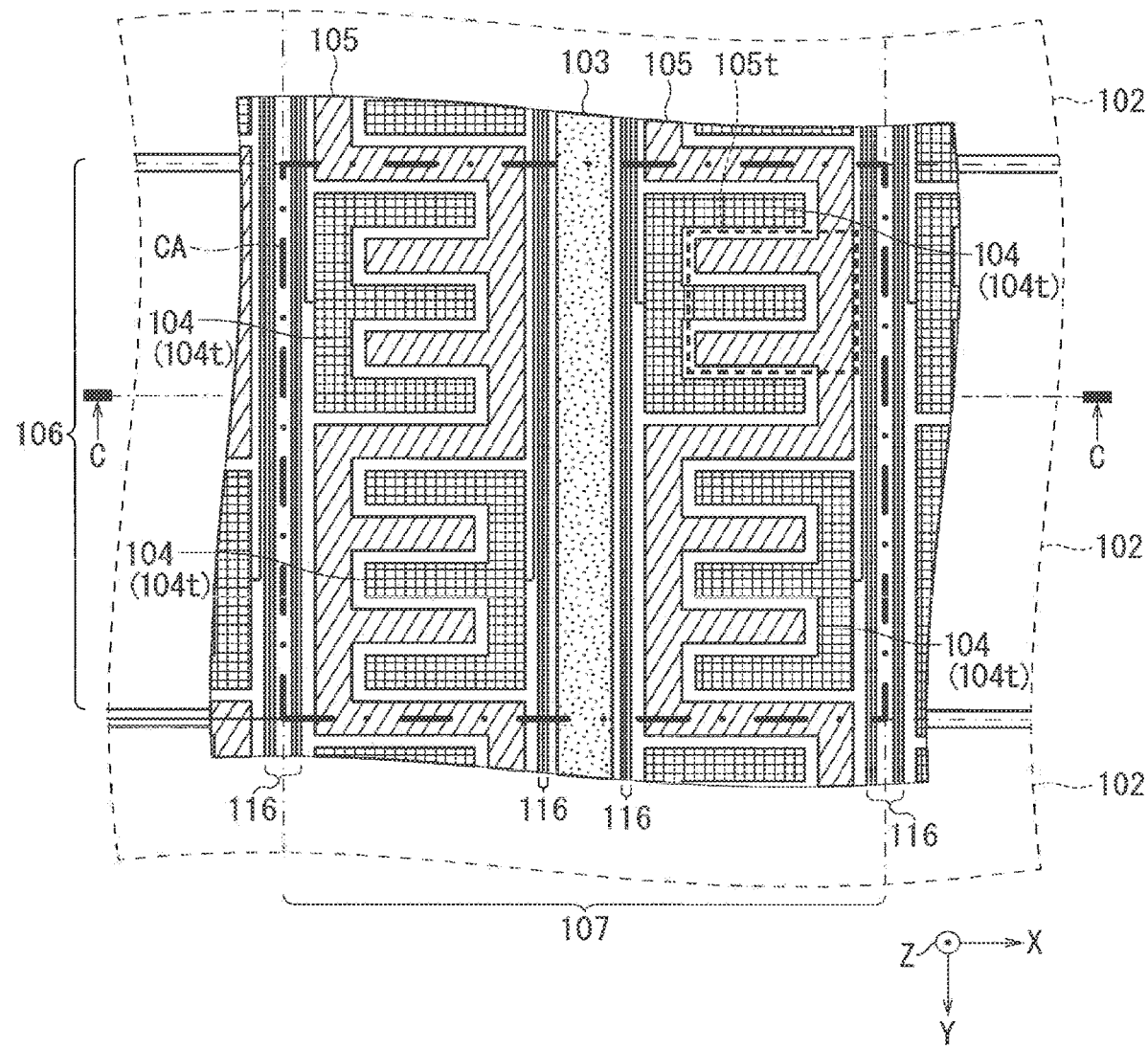
FIG. 11 is a plan view illustrating an intersection area between a tactile sensation row electrode group and a tactile sensation column electrode group, and an electrode configuration in the vicinity of the interface area according to Embodiment 4.

FIG. 11 is a plan view illustrating an intersection area CA between a tactile sensation row electrode group 106 and a column electrode group 107, and an electrode configuration in the vicinity of the intersection area according to Embodiment 4. The intersection area CA corresponds to the intersection area CA in FIG. 1. Note that the constituent elements 2 to 7 in FIG. 1 correspond to constituent parts 102 to 107 according to Embodiment 4, which will be described later, and the lead lines 10 correspond to segment electrode lines 116. FIG. 11 is a schematic diagram and illustrates the electrodes 2 to 5 in rectangular shapes for convenience of illustration.

Figure 12:
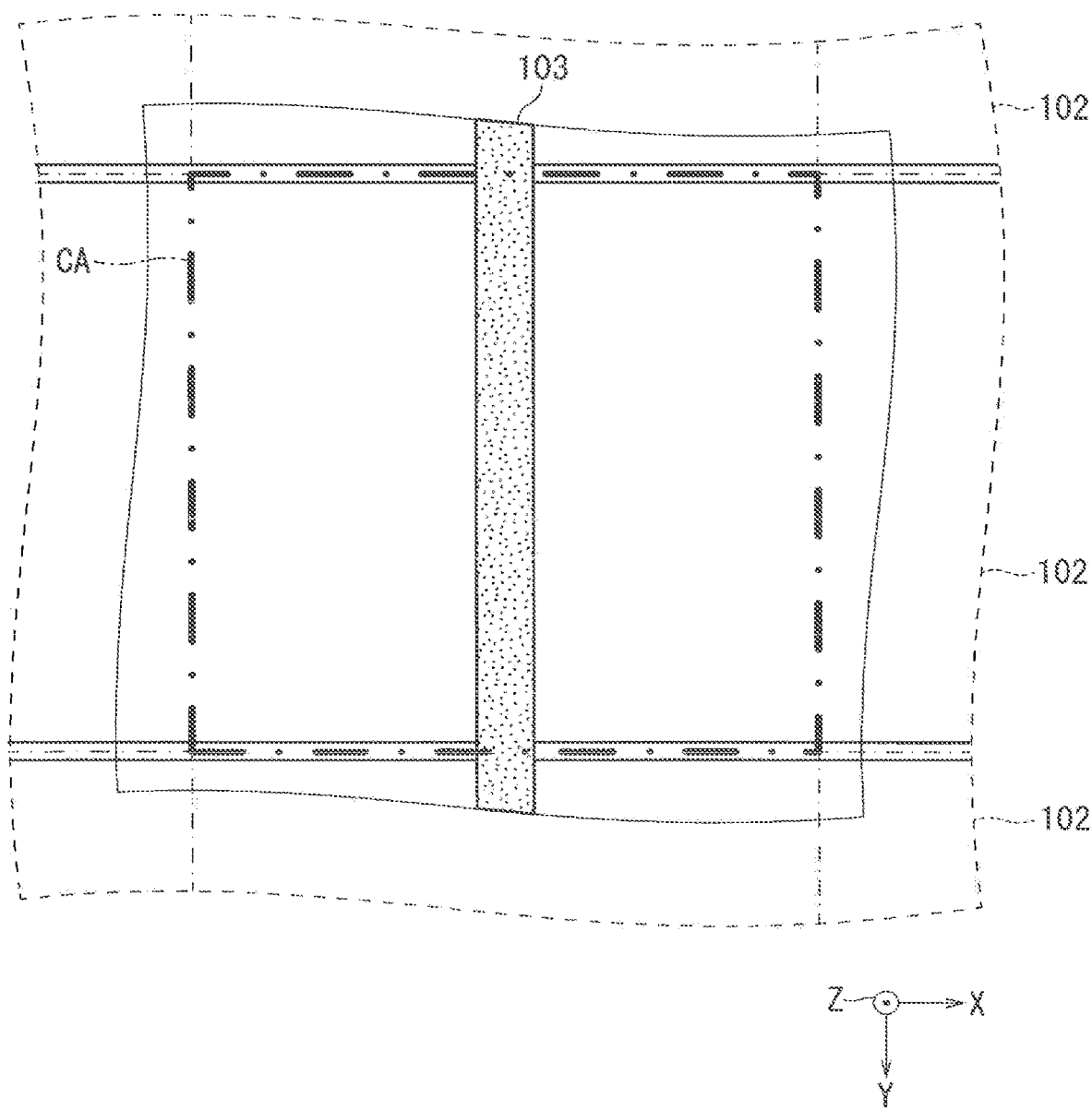
FIG. 12 is a plan view extracting and illustrating only excitation electrodes 102 and a detection electrode 103 in an intersection area.
Figure 13:
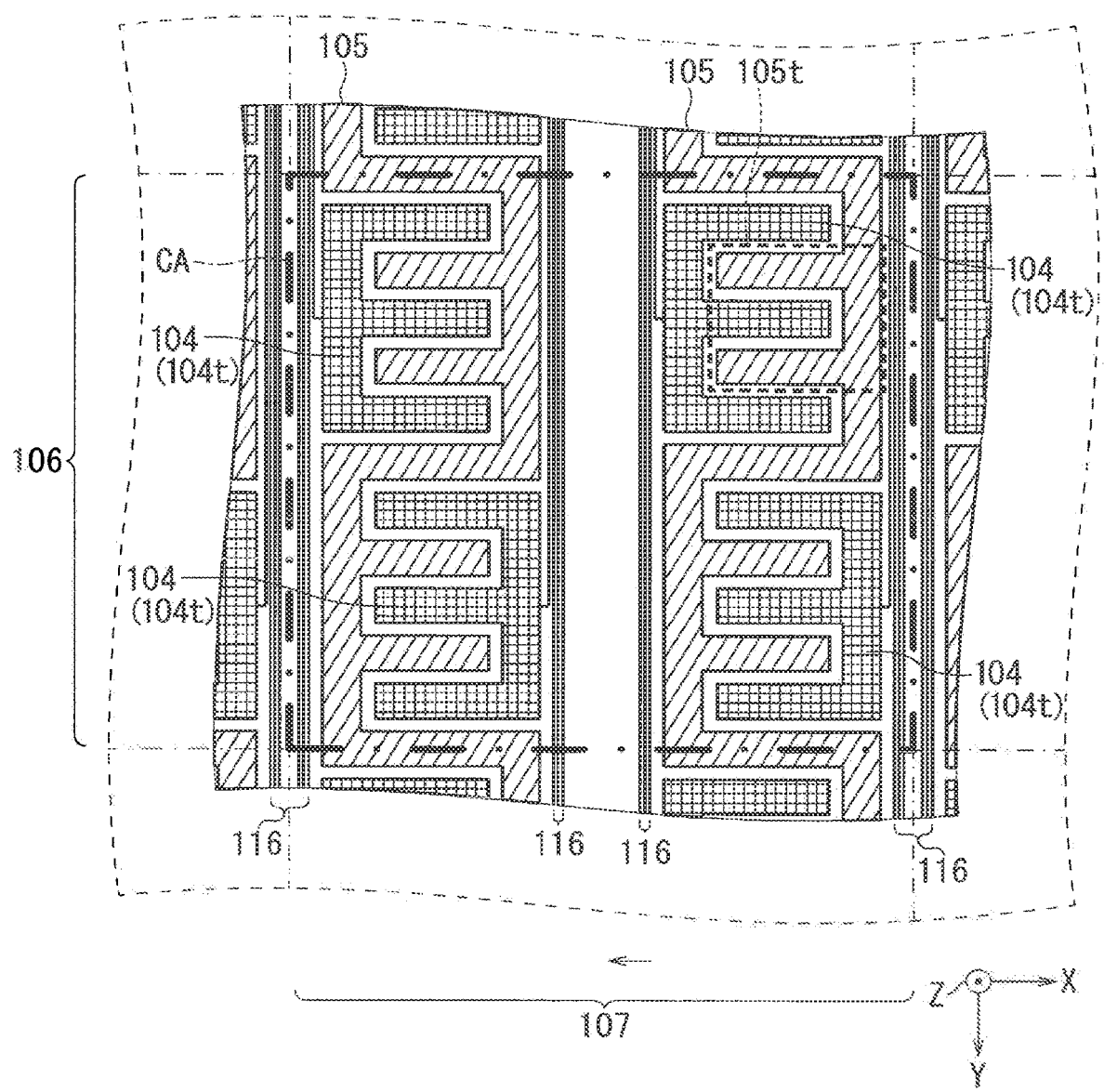
FIG. 13 is a plan view extracting and illustrating only tactile sensation generation segment electrodes 104 and tactile sensation generation column electrodes 105 in the intersection area.

FIG. 12 is a plan view extracting and illustrating only excitation electrodes 102 and detection electrodes 103, which are the first and second touch detection electrodes, in the intersection area CA. FIG. 13 is a plan view extracting and illustrating only tactile sensation generation segment electrodes 104 and tactile sensation generation column electrodes 105, which are the first and second tactile sensation generation electrodes, in the intersection area CA.

According to Embodiment 4, a plurality of tactile sensation generation segment electrodes 104 are separately arranged in a matrix (separately arranged in both of the X and Y directions), independently of the plurality of excitation electrodes 102, on the front side of the transparent substrate 33. Each tactile sensation generation segment electrode 104 has a comb tooth portion 104t (first comb tooth portion) having a toothed comb-like shape as a whole in a plan view. The plurality of tactile sensation generation column electrodes 105 are formed independently of the plurality of detection electrodes 103 and each extend in a zigzag line in the column direction by coupling the number of comb tooth portions 105t (second comb tooth portions) having a toothed comb-like shape in a plan view together, the number corresponding to the number of rows (at least two). The comb tooth portions 104t (tactile sensation generation segment electrodes 104) are each arranged so as to fit in each comb tooth portion 105t of a corresponding one of the plurality of tactile sensation generation column electrodes 105 while keeping a space therebetween.

That is, the entire structure of each tactile sensation generation segment electrodes 104 forms a comb tooth portion 104t. A structure is also possible in which part of the tactile sensation generation segment electrode 104 forms a comb tooth portion 104t.

In the intersection area CA of the tactile sensation row electrode group 106 and the column electrode group 107, one tactile sensation generation column electrode 105 is installed in each of the right and left parts of the intersection area CA, and a pair of upper and lower tactile sensation generation segment electrodes 104 arranged in the column direction are provided in correspondence with the two comb tooth portions 105t of each of the right and left tactile sensation generation column electrodes 105, i.e., a total of four tactile sensation generation segment electrodes 104 (comb tooth portions 104t) are provided.

The comb tooth portions 105t, which are second comb tooth portions, and the comb tooth portions 104t, which are first comb tooth portions, extend on the opposite sides in the row direction (X direction) (e.g., each comb teeth of the comb tooth portions 104 extends in the –X direction, and each comb teeth of the comb tooth portions 105 extends in the +X direction).

Then, the detection electrodes 103, which are the second touch detection electrodes, are arranged extending in the column direction while keeping a space from the tactile sensation generation segment electrodes 104 arranged along the two tactile sensation generation column electrodes 105. Here, the detection electrodes 103 are assumed to have a rectangular shape in a plan view.

In the touch screen 1D according to Embodiment 4, the excitation electrodes 102, which are the first touch detection electrodes, are provided extending in the row direction on the back side of the transparent substrate 33, similarly to the excitation electrodes 2 according to Embodiments 1 to 3 described above.

Assuming that the plurality of tactile sensation generation segment electrodes 104 are separately arranged in a matrix of α rows and β columns (α≥2, β≥2), the tactile sensation generation column electrode 105 in each column is configured such that comb tooth portions 104t, which are α (at least two) tactile sensation generation segment electrodes 104 existing in the same column, and α comb tooth portions 105t fit in one another while keeping a space between each pair of corresponding comb tooth portions 104t and 105t.

In this way, the tactile sensation generation segment electrodes 104 and the tactile sensation generation column electrodes 105 are formed without overlapping with one another in a plan view, and the detection electrodes 103 are formed without overlapping with the tactile sensation generation segment electrodes 104 and the tactile sensation generation column electrodes 105 in a plan view.

The segment electrode lines 116 connected to the tactile sensation generation segment electrode 104 are provided in clearance areas among each tactile sensation generation segment electrode 104, each tactile sensation generation column electrode 105, and each detection electrode 103, and connected to terminal parts (not shown). Note that the segment electrode lines 116 may be fine metal wiring.

Figure 14:
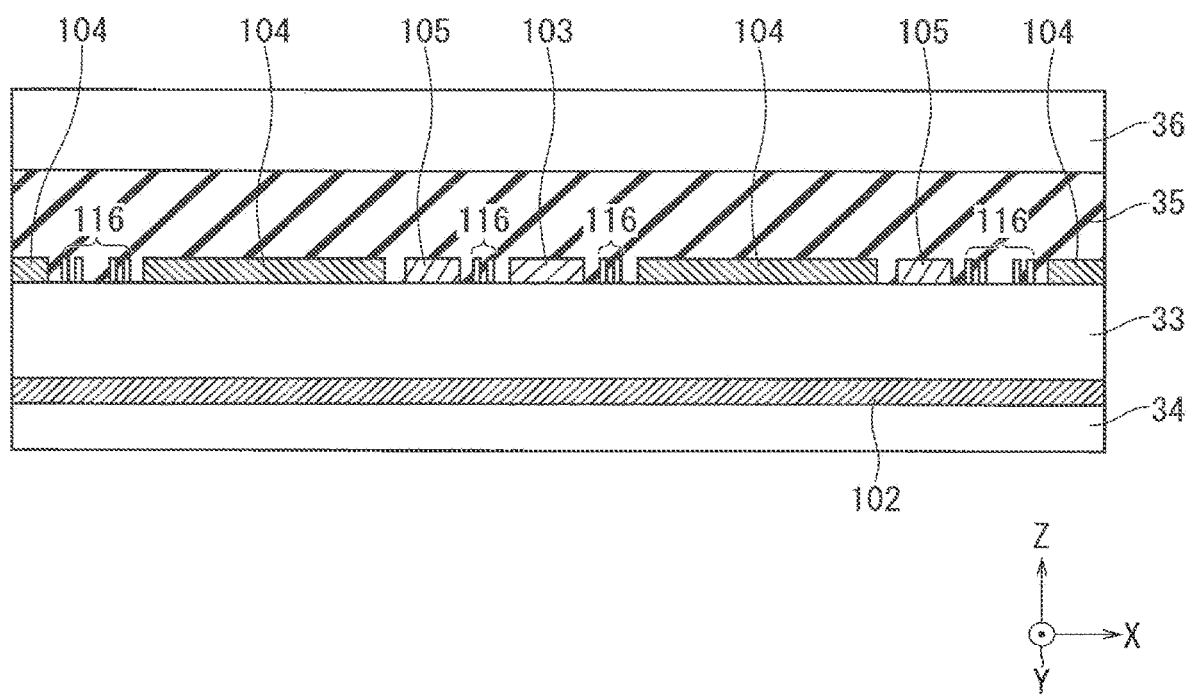
FIG. 14 is a cross-sectional view schematically illustrating a cross-sectional configuration taken along line C-C in FIG. 11.

FIG. 14 is a cross-sectional view schematically illustrating a cross-sectional configuration taken along line C-C in FIG. 11. As illustrated in FIG. 14, the excitation electrodes 102 are formed of a transparent conductive film on the back surface of the glass substrate 33, which is a transparent substrate, and a transparent protective film 34 is further formed to cover the excitation electrodes 102.

The tactile sensation generation segment electrodes 104, the tactile sensation generation column electrodes 105, and the detection electrodes 103 are formed of a transparent conductive film in the same wiring layer on the front surface of the glass substrate 33. That is, the detection electrodes 103, the tactile sensation generation segment electrodes 104, and the tactile sensation generation column electrodes 105 are formed to the same height on the front surface of the glass substrate 33, and therefore can be manufactured simultaneously as the same wiring layer.

In this way, the electrodes 103 to 105 on the front side of the transparent electrode 33 are formed in the same wiring layer. This configuration can simplify the manufacturing process and reduce a manufacturing cost.

A high-resistance, transparent charge storage layer 35 for storing electrical charges is further formed in a layer above the detection electrodes 103, the tactile sensation generation segment electrodes 104, and the tactile sensation generation column electrodes 105, and a transparent protective film 36 is further formed in a layer above the charge storage layer 35. The surface of this protective film 36 is the operation screen OS that is operated by the indicator such as a finger.

As described above, in the touch screen 1D according to Embodiment 4, the comb tooth portions 104t constituting each tactile sensation generation segment electrode 104 are arranged so as to fit in the corresponding comb tooth portions 105t of the tactile sensation generation column electrodes 105 while keeping a space therebetween.

The plurality of tactile sensation generation segment electrodes 104 separately arranged in a matrix are each independently connected to a corresponding one of the segment electrode lines 116. The segment electrode lines 116 are connected to an external flexible print circuit (FPC) via the front-side terminals 12. At this time, wiring of the FPC is provided such that tactile sensation generation segment electrodes 104 corresponding to the same row are electrically connected in common. That is, the wiring parts of the FPC corresponding to each row play a role electrically equivalent to that of the tactile sensation generation row electrodes 4 according to Embodiment 1.

Similarly to the touch screen 1 according to Embodiment 1, the touch screen 1D according to Embodiment 4 can also make a touch panel device implementable with the circuit configuration illustrated in FIG. 6. The touch screen 1D, however, differs in that m tactile sensation row electrode groups 106 are each configured by tactile sensation generation segment electrodes Why1(j) arrayed in the row direction in the upper part (on the −Y direction side) and tactile sensation generation segment electrodes Why2(j) arrayed in the row direction in the lower part (on the +Y direction side), where j is any integer from 1 to m.

More specifically, when the plurality of tactile sensation generation segment electrodes 104 are separately arranged in a matrix of m rows and n columns illustrated in FIG. 6 (more specifically, two rows and two columns of tactile sensation generation segment electrodes 104 are arrayed within the intersection area CA), the (2m×2n) segment electrode lines 116 connected to the plurality of tactile sensation generation segment electrodes 104 are each independently connected to the front-side terminals 12. Then, the front-side terminals 12 and the tactile sensation voltage generating circuit part 68 are electrically connected via, for example, the wiring of the FPC. At this time, the tactile sensation generation segment electrodes Why1(j) arrayed in the row direction in the upper part of each tactile sensation row electrode group 106 are connected in common by the wiring of the FPC, and the tactile sensation generation segment electrodes Why2(j) arrayed in the row direction in the lower part are connected in common by the wiring of the FPC. The number of pieces of wiring of the FPC that are connected in common for each of the tactile sensation generation segment electrodes Why1 and Why2 is m, i.e., a total number of pieces of wiring is 2m. When tactile sensation is controlled by the application of the tactile sensation generation voltage, these 2m pieces of wiring of the FPC correspond to the tactile sensation generation row electrodes according to Embodiment 1.

As in Embodiment 1, a case is assumed in which it is determined that the touched position is in the vicinity of the tactile sensation generation column electrode Whx1(p), where p is any integer from 1 to n, and the tactile sensation generation segment electrode Why1(q), where q is any integer from 1 to m.

That is, in the case of selecting electrodes that are used to generate tactile sensation, the wiring of the FPC that commonly connects the tactile sensation generation segment electrode Why1(q) arrayed in the row direction in the upper part of the tactile sensation row electrode group 106 in the q-th row becomes a pseudo selected tactile sensation generation row electrode (first selected tactile sensation generation electrode), and the tactile sensation generation column electrode Whx1(p) in the p-th column becomes a selected tactile sensation generation column electrode 105 (second selected tactile sensation generation electrode).

The tactile sensation generation voltage from the tactile sensation voltage generating circuit (Y) 65 is commonly applied to the array of tactile sensation generation segment electrodes 104 arrayed in the row direction in the upper part of the tactile sensation row electrode group 106 in the q-th row via the wiring part of the FPC, the front-side terminals 12, and the segment electrode lines 116.

As described above, in the touch screen 1D according to Embodiment 4, the excitation electrodes 102, which are first touch detection electrodes set to a low-impedance state and provided on the back surface of the glass substrate 33, can shield the detection electrodes 103, the tactile sensation generation segment electrodes 104, and the tactile sensation generation column electrodes 105, which are respectively the second touch detection electrodes, the first tactile sensation generation electrode, and the second tactile sensation generation electrode provided on the front surface of the glass substrate 33. It is thus possible to suppress intrusion of driving noise from the display panel, which is ordinarily incorporated on the back side of the glass substrate 33, into the detection electrode 103, and to further suppress intrusion of the tactile sensation generation signals, which are applied to the selected tactile sensation generation column electrode 105 and the selected tactile sensation generation segment electrodes 104 in the same row electrically connected in common via the wiring part of the FPC, as noise into the display panel and thereby suppress the occurrence of display problems such as unevenness in display.

Since the excitation electrodes 102, the tactile sensation generation segment electrodes 104, the detection electrodes 103, and the tactile sensation generation column electrodes 105 are not shared with each other and thus provided completely independent of each other, there is no need for additional constituent elements such as a switching circuit with high breakdown voltage, which may be necessary to conduct or interrupt the tactile sensation generation signals, and therefore the circuit configuration of the touch panel device can be simplified.

In addition, the first pitch in the column direction between the excitation electrodes 102, which is set on the basis of the desired precision of the touch coordinates, and the second pitch in the row direction between the detection electrodes 103 can be respectively set different from the third pitch in the column direction between the tactile sensation generation segment electrodes 104 and the fourth pitch in the row direction between the tactile sensation generation column electrodes 105, which are set on the basis of the desired tactile sensation resolution. Accordingly, it is possible to avoids situations such as where any of the interelectrode pitches among the first and second pitches and the third and fourth pitches may be set unnecessarily narrow, which makes the device configuration complicated, or where any of the interelectrode pitches may be set unnecessarily wide, which sacrifices the precision of the touch coordinates or the tactile sensation generation resolution.

Embodiment 4 differs from Embodiment 1 in that the first pitch of the excitation electrodes 102 is set to two times the third pitch of the tactile sensation generation segment electrodes 104.

The detection electrodes 103, the tactile sensation generation segment electrodes 104, and the tactile sensation generation column electrodes 105 are formed directly on the front surface of the glass substrate 33, which is a single transparent substrate, and the excitation electrodes 102 are formed directly on the back surface of the glass substrate. This configuration allows the thickness in the height direction (Z direction in FIGS. 11 to 14) of the touch screen to be reduced as compared with cases such as where the configuration includes two substrates, one for the excitation electrodes 102 and the detection electrodes 103 and the other for the tactile sensation generation segment electrodes 104 and the tactile sensation generation column electrodes 105.

Moreover, the structure of the touch screen 1D can be simplified because the detection electrodes 103, the tactile sensation generation segment electrodes 104, and the tactile sensation generation column electrodes 105 are formed to the same height and therefore can be formed simultaneously as the same wiring layer (first wiring layer). This configuration can further simplify the manufacturing process of the touch screen 1D and reduce cost.

The detection electrodes 103, the tactile sensation generation segment electrodes 104, and the tactile sensation generation column electrodes 105 on the front surface of the glass substrate 33 are arranged without overlapping with one another in a plan view. This configuration can suppress situations such as where the presence of the tactile sensation generation segment electrodes 104 and the tactile sensation generation column electrodes 105 may inhibit a change in interelectrode capacitance (mutual capacitance) between the excitation electrodes 102 and the detection electrodes 103, the change occurring when the indicator such as the operator's finger has approached or contacted the screen. It is thus possible to suppress a reduction in the touch detection sensitivity of the touch panel device including the touch screen 1D.

Since the detection electrodes 103, the tactile sensation generation segment electrodes 104, and the tactile sensation generation column electrodes 105 are arranged without overlapping with one another in a plan view, a reduction in display light transmittance can be suppressed.

Since the detection electrodes 103, the tactile sensation generation segment electrodes 104, and the tactile sensation generation column electrodes 105 on the front surface of the glass substrate 33 are arrayed regularly without overlapping with one another in a plan view, there is no unevenness in transmittance due to uneven overlaps of the excitation electrodes 102, which are provided on the back surface of the glass substrate 33, and the detection electrodes 103, the tactile sensation generation segment electrodes 104, and the tactile sensation generation column electrodes 105, which are provided on the front surface of the glass substrate 33. As a result, it is possible to suppress a situation where the electrodes 102 to 104 are visually recognized due to the presence of uneven overlaps of the electrodes.

Similarly to Embodiment 2 (see FIGS. 8 and 9), Embodiment 4 may adopt a fine metal wiring mesh structure for the excitation electrodes 102 in order to reduce the electrode resistance of the excitation electrodes 102 and thereby improve the shielding effect of the excitation electrodes 102 shielding the detection electrodes 103, the tactile sensation generation segment electrodes 104, and the tactile sensation generation column electrodes 105. Since, in this case, the display light passes through substantially a single-layer transparent conductive film (detection electrodes 103, tactile sensation generation segment electrodes 104, and tactile sensation generation column electrodes 105), instead of passing through a two-layer transparent conductive film, the degree of the yellow tinge, which is a peculiar feature of the transparent conductive film, can be reduced.

Moreover, similarly to Embodiment 2 (see FIGS. 8 and 9), Embodiment 4 can reduce moiré fringes induced by interference with pixel lattices of the display panel incorporated on the back side of the glass substrate 33, by providing the excitation electrodes 102 having a metal wiring mesh structure configured by a combination of the metal mesh inclined straight portions 21 and 22, which extend in the third and fourth directions.

Similarly to Embodiment 3, Embodiment 4 may adopt the shield electrode 70 illustrated in FIG. 10, in which case the back-side terminal 13L connected to the shield electrode 70 is connected to the GND outside the touch screen 1D. This configuration allows the shield electrode 70 to exhibit the function of shielding the plurality of lead lines 9, the plurality of segment electrode lines 116, and the plurality of lead lines 11, which are electrically connected to the detection electrodes 103, the tactile sensation generation segment electrodes 104, and the tactile sensation generation column electrodes 105, and the plurality of front-side terminals 12 (a plurality of external connection terminals). Note that the constituent elements 2 to 7 in FIG. 10 correspond to the constituent elements 102 to 107, and the lead lines 10 correspond to the segment electrode lines 116.

That is, the lead lines 9 of the detection electrodes 103 and the front-side terminals 12 connected to the lead lines 9 can be shielded from propagation of driving signals as noise output from the display panel, which is ordinarily incorporated on the back side. Moreover, the display can be shielded from propagation of the tactile sensation generation signals as noise, which are applied to the segment electrode lines 116 of the tactile sensation generation segment electrodes 104, the lead lines 11 of the tactile sensation generation column electrodes 105, and the front-side terminals 12 connected to those lines 116 and 11.

In the touch panel device according to Embodiment 4 in which the tactile sensation voltage generating circuit part 67 and the tactile sensation voltage generating circuit part 68 illustrated in FIGS. 6 and 7 are adopted into the touch screen 1D according to Embodiment 4, the charge detection circuit 61 detects the electric-charge detection result D61 (electrostatic-capacitance derived data) by using the excitation electrodes 102 and the detection electrodes 103 of the touch screen 1D, and the touch-coordinate calculation circuit 62 determines whether the screen has been touched, on the basis of the degree of change of the electric-charge detection results D61. When it is determined that the screen has been touched, the touch-coordinate calculation circuit 62 calculates the detected coordinate data D62. On the basis of the detected coordinate data D62, the tactile sensation voltage generating circuit part 68 provides tactile feedback upon receipt of the input operation via the operator's finger by applying the tactile sensation generation signals to the pseudo selected tactile sensation generation segment electrodes 104 and the selected tactile sensation generation column electrode 105, which correspond to the touch coordinates, and charging the charge storage layer 35 in the vicinity of the intersection area of the pseudo selected tactile sensation generation segment electrodes 104 and the selected tactile sensation generation column electrode 105 to a value exceeding the tactile threshold value so as to provide tactile sensation to the finger.

Similarly to Embodiment 1, Embodiment 4 is also configured such that, during the tactile sensation generation signal application period P5, the excitation electrodes 102 on the back side of the glass substrate 33, which are transparent electrodes, are fixed at low impedance to the GND potential outside the touch screen 1D and function as shield electrodes against the tactile sensation generation signals having their "H" levels set to high tactile sensation generation voltages. It is thus possible to prevent the tactile sensation generation signals with their "H" levels set to high tactile sensation generation voltages from entering, as noise, the display panel which is ordinarily incorporated on the back side of the glass substrate 33 in the touch panel device, and to thereby prevent the occurrence of display problems such as unevenness in display.

Moreover, similarly to Embodiment 1, Embodiment 4 is also configured such that the tactile sensation voltage generating circuit part 68 sets all of the tactile sensation generation segment electrodes 104 and the tactile sensation generation column electrodes 105 to a floating state during the touch detection period P1. This prevents the tactile sensation generation segment electrodes 104 and the tactile sensation generation column electrodes 105 from shielding the electric field formed between the excitation electrodes 102 and the detection electrodes 103, and suppresses a reduction in the degree of change in mutual capacitance between the excitation electrodes 102 and the detection electrodes 103, i.e., a reduction in touch detection sensitivity, which may be caused by the touch operation.

Other Embodiments

While Embodiments 1 to 4 above describe the case where the glass substrate 33 is a transparent substrate, these embodiments may also be implemented by using, for example, a film substrate, instead of the glass substrate 33.

While the aforementioned embodiments describe a configuration in which the electrodes 2 to 5 (102 to 105) are directly formed on either the front or back surface of the glass substrate 33, which is a transparent substrate, the configuration does not necessarily have to be configured by a single substrate. At least the excitation electrodes 2 among the electrodes 2 to 5 may be arranged closest to the back side (−Z side) of the glass substrate 33 when viewed from the operation screen side, and for example, a configuration is possible in which the excitation electrodes 2 are formed on the front surface of a film substrate, instead of being formed on the back surface of the glass substrate 33, and the back surface of the film substrate is bonded to the back surface of the glass substrate 33.

While Embodiments 1 to 3 describe a configuration in which, on the front side of the glass substrate 33 which is a transparent substrate, the whole of the tactile sensation generation row electrodes 4, the detection electrode principal parts 30, and the tactile sensation generation row electrode principal parts 40 are formed as the first wiring layer, and the detection electrode intersection parts 31 and the tactile sensation generation column electrode intersection parts 51 are formed as the second wiring layer that is stacked on the first wiring layer via the insulation film 32, the present invention is not limited to such a configuration of the wiring layers. For example, the aforementioned positional relationship may be reversed such that the detection electrodes 3, the whole of the tactile sensation generation column electrodes 5, and the tactile sensation generation row electrode principal parts 40 are formed as the first wiring layer, and the tactile sensation generation row electrode intersection parts 41 are formed as the second wiring layer.

While an exemplary case is described in which the number of tactile sensation generation row electrodes 4 (tactile sensation generation segment electrodes 104 in the same row) to which the tactile sensation generation signal is to be applied and the number of tactile sensation generation column electrodes 5 (tactile sensation generation column electrodes 105) to which the tactile sensation generation signal is to be applied are both one, the signals may be applied to a plurality of electrodes according to the tactile sensation desired to be provided. For example, the tactile sensation generation signal may be applied to all of the three tactile sensation generation row electrodes 4 that belong to a common tactile sensation row electrode group 6, or the tactile sensation generation signal may be applied to all of the two tactile sensation generation column electrodes 5 that belong to one column electrode group 7.

While the above description takes the example of the case in which tactile feedback is provided upon receipt of input provided with a touch by the operator, it goes without saying that tactile sensation may be provided according to the content of a display image.

While the touch detection circuit part 67 and the tactile sensation voltage generating circuit part 68 illustrated in FIG. 7 are all configured by hardware, a configuration is also possible in which part of the charge detection circuit 61, the touch-coordinate calculation circuit 62, the touch-detection control circuit 63, and the tactile sensation generation control circuit 66 are executed by program processing using a CPU based on software.

Note that embodiments of the present invention may be freely combined or appropriately modified or omitted within the scope of the present invention.

While the invention has been shown and described in detail, the foregoing description is in all aspects illustrative and not restrictive. It is therefore to be understood that numerous modifications and variations can be devised without departing from the scope of the invention.

The invention claimed is:
1. A touch screen having an operation screen, comprising:
a transparent substrate having a first main surface and a second main surface opposite to the first main surface;

a plurality of first touch detection electrodes that are each disposed along a first direction and to which an excitation pulse signal is applied during a touch detection period;
a plurality of second touch detection electrodes that are each disposed along a second direction that intersects with said first direction; and
a plurality of tactile sensation generation electrodes that are provided independently of said plurality of first and second touch detection electrodes and to which a tactile sensation generation signal is applied,
wherein said plurality of tactile sensation generation electrodes include a plurality of first tactile sensation generation electrodes and a plurality of second tactile sensation generation electrodes that intersect with said plurality of first tactile sensation generation electrodes,
said tactile sensation generation signal includes a first tactile sensation generation signal and a second tactile sensation generation signal that is different from said first tactile sensation generation signal,
wherein said plurality of first touch detection electrodes are formed on the second main surface of said transparent substrate, said plurality of second touch detection electrodes, said plurality of first tactile sensation generation electrodes, and said plurality of second tactile sensation generation electrodes are formed directly on the first main surface of said transparent substrate, and said operation screen is on a side of the first main surface,
wherein said plurality of second touch detection electrodes, said plurality of first tactile sensation generation electrodes, and said plurality of second tactile sensation generation electrodes are independently driven, said first tactile sensation generation signal is applied to said plurality of first tactile sensation generation electrodes, and said second tactile sensation generation signal is applied to said plurality of second tactile sensation generation electrodes, and
wherein said plurality of first tactile sensation generation electrodes are each disposed along said first direction, and said plurality of second tactile sensation generation electrodes are each disposed along said second direction.

2. The touch screen according to claim 1, wherein
each of said plurality of second touch detection electrodes includes a combined structure of a detection principal part and a detection intersection part that is formed narrower than said detection principal part,
each of said plurality of tactile sensation generation electrodes includes a combined structure of a tactile sensation generation principal part and a tactile sensation generation intersection part that is formed narrower than said tactile sensation generation principal part, and
said detection principal part and said tactile sensation generation principal part are formed to a same height on the first main surface of said transparent substrate without overlapping with one another in a plan view.

3. The touch screen according to claim 1, wherein
said plurality of first touch detection electrodes each have a rectangular shape in a plan view and are arranged such that each of said first touch detection electrodes overlaps with a given number K of said first tactile sensation generation electrodes in a plan view, wherein K≥2.

4. The touch screen according to claim 1, wherein
each of said plurality of second touch detection electrodes includes a combined structure of a detection principal part and a detection intersection part that is formed narrower in said first direction than said detection principal part,
each of said plurality of first tactile sensation generation electrodes includes a combined structure of a first tactile sensation generation principal part and a first tactile sensation generation intersection part that is formed narrower in said second direction than said first tactile sensation generation principal part,
each of said plurality of second tactile sensation generation electrodes includes a combined structure of a second tactile sensation generation principal part and a second tactile sensation generation intersection part that is formed narrower in said first direction than said second tactile sensation generation principal part,
said first direction is a row direction, and said second direction is a column direction that is orthogonal to said row direction,
each of said detection principal part, said first tactile sensation generation principal part, and said second tactile sensation generation principal part has a rhombus shape in a plan view and is arranged such that two pairs of opposing angular portions thereof are respectively arranged in said row direction and said column direction,
said detection principal part, said first tactile sensation generation principal part, and said second tactile sensation generation principal part respectively include a plurality of detection principal parts, a plurality of first tactile sensation generation principal parts, and a plurality of second tactile sensation generation principal parts, each having said rhombus shape in a plan view,
each adjacent pair of said plurality of detection principal parts are configured such that angular portions of the pair that face each other in said column direction are connected by said detection intersection part,
each adjacent pair of said plurality of first tactile sensation generation principal parts are configured such that angular portions of the pair that face each other in said row direction are connected by said first tactile sensation generation intersection part,
each adjacent pair of said plurality of second tactile sensation generation principal parts are configured such that angular portions of the pair that face each other in said column direction are connected by said second tactile sensation generation intersection part, and
said plurality of detection principal parts and said plurality of second tactile sensation generation principal parts are arranged at a regular interval in said column direction, and said plurality of first tactile sensation generation principal parts are arranged at a regular interval in said row direction.

5. The touch screen according to claim 1, wherein
said plurality of tactile sensation generation electrodes include:
a plurality of first tactile sensation generation electrodes that are separately disposed from one another in said first and second directions, independently of said plurality of first touch detection electrodes; and
a plurality of second tactile sensation generation electrodes that are each disposed along said second direction, independently of said plurality of second touch detection electrodes.

6. The touch screen according to claim 5, wherein
said first direction is a row direction, said second direction is a column direction that is orthogonal to said row direction, and said plurality of first tactile sensation generation electrodes are separately arranged from one another in a matrix,
each of said plurality of second touch detection electrodes has a rectangular shape in a plan view,
each of said plurality of first tactile sensation generation electrodes has a first comb tooth portion having a comb tooth shape in a plan view,
each of said plurality of second tactile sensation generation electrodes has at least two second comb tooth portions arranged in said column direction and each having a comb tooth shape in a plan view,
said second comb tooth portions and said first comb tooth portion extend on opposite sides in said row direction, and
said plurality of second tactile sensation generation electrodes are arranged such that said second comb tooth portions fit in at least two of said first comb tooth portions in the same column while keeping a space therebetween.

7. The touch screen according to claim 1, wherein
said first touch detection electrodes have a metal wiring mesh structure.

8. The touch screen according to claim 7, wherein
said metal wiring mesh structure includes a combined structure of inclined straight portions of a first type and a second type that intersect with each other, and
said inclined straight portions of the first type and the second type respectively extend in third and fourth directions that intersect with both of said first and second directions.

9. The touch screen according to claim 1, further comprising:
a plurality of external connection terminals;
lead lines of a first type, a second type, and a third type that are formed on the first main surface of said transparent substrate and electrically connect said plurality of external connection terminals respectively with said plurality of second touch detection electrodes, said plurality of first tactile sensation generation electrodes, and said plurality of second tactile sensation generation electrodes; and
a shield electrode that is provided on the second main surface of said transparent substrate and disposed overlapping with said lead lines of the first to third types in a plan view.

10. A touch panel device comprising:
the touch screen according to claim 1;
a touch detection circuit part configured to obtain electrostatic-capacitance derived data, from which electrostatic capacitances between said plurality of first touch detection electrodes and said plurality of second touch detection electrodes are derivable, while selectively applying said excitation pulse signal to said plurality of first touch detection electrodes and determine whether said operation screen has been touched by an indicator on the basis of said electrostatic-capacitance derived data during said touch detection period, and when it is determined that said operation screen has been touched, compute touch coordinates on said operation screen on the basis of said electrostatic-capacitance derived data to obtain detected coordinate data during a touch-coordinate calculation period following said touch detection period; and
a tactile sensation voltage generating circuit part configured to provide tactile sensation to said indicator on said operation screen by selectively applying a tactile sensation generation signal having a tactile sensation generation voltage between said plurality of first tactile sensation generation electrodes and said plurality of second tactile sensation generation electrodes,
wherein said tactile sensation voltage generating circuit part is configured to determine said first tactile sensation generation electrode and said second tactile sensation generation electrode to which said tactile generation signal is to be applied among said plurality of first tactile sensation generation electrodes and said plurality of second tactile sensation generation electrodes, as first and second selected tactile sensation generation electrodes on the basis of at least one of said electrostatic-capacitance derived data and said detected coordinate data that are detected by said touch detection circuit part, and apply said tactile sensation generation signal to said first and second selected tactile sensation generation electrodes.

11. The touch panel device according to claim 10, wherein
said plurality of first touch detection electrodes are set to a fixed potential during a tactile sensation generation signal application period in which said tactile sensation generation signal is applied.

12. The touch panel device according to claim 10, wherein
said tactile sensation voltage generating circuit part is configured to set said plurality of first tactile sensation generation electrodes and said plurality of second tactile sensation generation electrodes to a floating state during said touch detection period.

13. The touch screen according to claim 1, further comprising a charge storage layer that is disposed between said operation screen and said transparent substrate.

14. The touch screen according to claim 1, wherein said plurality of first tactile sensation generation electrodes and said plurality of second tactile sensation generation electrodes are alternated in proximity to at least one of said plurality of second touch detection electrodes along said second direction.

* * * * *